US 6,594,085 B2

(12) United States Patent
Ohtaka et al.

(10) Patent No.: US 6,594,085 B2
(45) Date of Patent: Jul. 15, 2003

(54) IMAGE DISPLAY APPARATUS AND OPTICAL SYSTEM

(75) Inventors: Keiji Ohtaka, Yokohama (JP); Takashi Sudo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 09/842,119

(22) Filed: Apr. 26, 2001

(65) Prior Publication Data

US 2002/0021498 A1 Feb. 21, 2002

(30) Foreign Application Priority Data

Apr. 28, 2000 (JP) .................................... 2000-131482

(51) Int. Cl.$^7$ ............................................ G02B 27/14

(52) U.S. Cl. ..................... 359/631; 359/630; 359/633

(58) Field of Search ........................... 359/630, 631, 359/633, 636, 637, 639, 640

(56) References Cited

U.S. PATENT DOCUMENTS

| RE27,356 E | 5/1972 | La Russa ................... 350/157 |
|---|---|---|
| 4,026,641 A | 5/1977 | Bosserman et al. ........ 350/298 |
| 4,081,209 A | 3/1978 | Heller et al. ............... 350/174 |
| 4,563,061 A | 1/1986 | Ellis .......................... 350/3.7 |
| 4,669,810 A | 6/1987 | Wood ......................... 350/3.7 |
| 4,775,217 A | 10/1988 | Ellis .......................... 350/538 |
| 4,874,214 A | 10/1989 | Cheysson et al. .......... 350/3.7 |
| 4,969,724 A | 11/1990 | Ellis .......................... 350/503 |
| 5,006,072 A | 4/1991 | Letovsky et al. ............ 434/61 |
| 5,093,567 A | 3/1992 | Staveley .................... 250/221 |
| 5,384,654 A | 1/1995 | Iba ............................ 359/364 |
| 5,416,876 A | 5/1995 | Ansley et al. .............. 385/116 |

(List continued on next page.)

FOREIGN PATENT DOCUMENTS

| EP | 0 365 406 | 4/1990 |
|---|---|---|
| EP | 0 380 035 | 8/1990 |
| EP | 0 408 344 | 1/1991 |
| EP | 0 556 598 | 8/1993 |
| EP | 0 583 116 | 2/1994 |
| EP | 0 618 471 | 10/1994 |
| EP | 0 687 932 | 12/1995 |
| GB | 1 578 136 | 11/1980 |
| GB | 2 246 900 | 2/1992 |
| JP | 58-78116 | 5/1983 |
| JP | 62-214782 | 9/1987 |
| JP | 1-274736 | 11/1989 |
| JP | 2-297516 | 12/1990 |
| JP | 3-101709 | 4/1991 |
| JP | 3-109029 | 5/1991 |
| JP | 4-242630 | 8/1992 |
| JP | 4-343313 | 11/1992 |
| JP | 5-303056 | 11/1993 |
| JP | 7-333551 | 12/1995 |
| JP | 8-50256 | 2/1996 |
| JP | 8-160340 | 6/1996 |
| JP | 8-234136 | 9/1996 |
| JP | 8-234137 | 9/1996 |
| JP | 11-125791 | 5/1999 |

*Primary Examiner*—Ricky Mack

(57) ABSTRACT

An image display apparatus includes a light source for supplying illumination light, a reflection type display element for modulating the illumination light into image light by reflecting the light, an illumination optical system for guiding the illumination light to the reflection type display element, and a projection optical system for guiding the image light to an observer. The image light is incident on the projection optical system via at least a portion of the illumination optical system. The illumination optical system has a part, in an area where both the illumination light and the image light pass, which changes an optical action depending on a state of incident light. The part acts to deflect the illumination light to decrease an incident angle with respect to the reflection type display element as compared with a case where the part does not exist.

23 Claims, 16 Drawing Sheets

U.S. PATENT DOCUMENTS

| | | | |
|---|---|---|---|
| 5,430,634 A | 7/1995 | Baker et al. | 362/32 |
| 5,436,763 A | 7/1995 | Chen et al. | 359/565 |
| 5,436,765 A | 7/1995 | Togino | 359/631 |
| 5,453,877 A | 9/1995 | Gerbe et al. | 359/633 |
| 5,459,612 A | 10/1995 | Ingleton | 359/630 |
| 5,479,224 A | 12/1995 | Yasugaki et al. | 353/101 |
| 5,483,307 A | 1/1996 | Anderson | 353/98 |
| 5,486,841 A | 1/1996 | Hara et al. | 345/8 |
| 5,486,892 A | 1/1996 | Suzuki et al. | 354/402 |
| 5,513,041 A | 4/1996 | Togino | 359/631 |
| 5,539,422 A | 7/1996 | Heacock et al. | 345/8 |
| 5,546,227 A | 8/1996 | Yasugaki et al. | 359/630 |
| 5,589,956 A | 12/1996 | Morishima et al. | 359/15 |
| 5,594,588 A | 1/1997 | Togino | 359/631 |
| 5,598,248 A | 1/1997 | Nagano et al. | 396/51 |
| 5,625,493 A | 4/1997 | Matsumura et al. | 359/630 |
| 5,640,632 A | 6/1997 | Koyama et al. | 396/382 |
| 5,671,062 A | 9/1997 | Nakamura | 359/687 |
| 5,689,736 A | 11/1997 | Okuyama et al. | 396/51 |
| 5,701,202 A | 12/1997 | Takahashi | 359/631 |
| 5,706,136 A | 1/1998 | Okuyama et al. | 359/630 |
| 5,734,505 A | 3/1998 | Togino et al. | 359/631 |
| 5,768,024 A | 6/1998 | Takahashi | 359/631 |
| 5,768,025 A * | 6/1998 | Togino et al. | 359/630 |
| 5,836,667 A | 11/1998 | Baker et al. | 362/32 |
| 5,875,056 A | 2/1999 | Takahashi | 359/633 |
| 6,014,524 A | 1/2000 | Suzuki et al. | 396/50 |
| 6,018,423 A | 1/2000 | Takahashi | 359/633 |
| 6,139,157 A | 10/2000 | Okuyuma | 353/102 |
| 6,191,892 B1 * | 2/2001 | Isaka et al. | 359/630 |
| 6,195,207 B1 | 2/2001 | Takahashi | 359/637 |
| 6,257,726 B1 | 7/2001 | Okuyama | 353/20 |
| 2001/0021068 A1 * | 9/2001 | Togino et al. | 359/630 |
| 2002/0034016 A1 * | 3/2002 | Inoguchi et al. | 359/630 |
| 2002/0036831 A1 * | 3/2002 | Inoguchi et al. | 359/630 |

* cited by examiner

IMAGE DISPLAY APPARATUS AND OPTICAL SYSTEM

BACKGROUND OF THE INVENTION

1. Field of the Invention

The present invention relates to an image display apparatus such as a head-mounted display (to be referred to as an HMD hereinafter).

2. Related Background Art

Conventionally, for HMDs and the like, various kinds of optical systems designed to reduce the overall apparatus size have been proposed. For example, Japanese Laid-Open Patent Application No. 7-333551 (corresponding to EP 0687932A3) discloses an apparatus for displaying an enlarged image of an image on the display surface of an image display means by using a prism-like optical element formed by a so-called free-form surface having no rotating axis of symmetry. Such a prism-like optical element makes it possible to correct image distortion, curvature of field, and astigmatism with a very compact, simple arrangement, and satisfy the telecentric condition required for a liquid crystal display surface when a liquid crystal is to be used as an image display means.

When a transmission type liquid crystal display panel is to be used as an image display means, the panel has drawbacks that the pixel apertures are small due to the presence of driving circuits such as TFTs and the graininess of the pixels is noticeable. For this reason, such a display panel is not suited to displaying moving images on a video player or TV and images with higher resolution on a PC or DVD player.

Under the circumstances, by using a reflection type liquid crystal display panel which can attain a reduction in apparatus size and an increase in pixel aperture, a high-resolution image without graininess can be obtained. For example, an image display apparatus using a currently proposed reflection type liquid crystal display panel is disclosed in Japanese Laid-Open Patent Application No. 11-125791. In this image display apparatus disclosed in this reference, as shown in FIG. 16 in this specification, rays of light from a light source 101 are directly guided to a reflection type liquid crystal display panel 102 without the mediacy of an optical element, thereby illuminating the reflection type liquid crystal display panel 102, and a prism-like decentered optical system 103 allows an observer to visually recognize the reflected image as an enlarged virtual image.

In the image display apparatus disclosed in the above reference, however, since light from the light source 101 is directly guided to the reflection type liquid crystal display panel 102 to illuminate it, the angle defined by the illumination light and the optical axis of the reflection type liquid crystal display panel 102 becomes large, resulting in an increase in the overall size of the display apparatus.

In addition, when a reflection type liquid crystal is used as a display panel, the contrast of a displayed image decreases as the incident angle of illumination light on the liquid crystal increases.

Furthermore, since the reflection type liquid crystal display panel 102 greatly inclines with respect to the decentered optical system 103, the distance from the decentered optical system 103 to the reflection type liquid crystal display panel 102 greatly varies depending on places within the panel surface. This makes it difficult to maintain good optical performance throughout the entire screen.

In another image display apparatus disclosed in Japanese Laid-Open Patent Application No. 11-125791, as shown in FIG. 17 in this specification, a light source 101 is placed on the opposite side of a reflection type liquid crystal display panel 102 to a prism-like decentered optical system 103 to illuminate the reflection type liquid crystal display panel 102 through the decentered optical system 103.

With this arrangement, however, illumination light from the light source 101 is reflected by the respective surfaces of the prism-like decentered optical system 103 to cause stray light and strike the eyes of an observer. As a consequence, ghosts and flare tend to occur.

SUMMARY OF THE INVENTION

It is an object of the present invention to provide an image display apparatus using a reflection type display element suited to high-resolution images such as PC outputs, in which the reflection type display element can be illuminated in an ideal state with a very simple, compact arrangement, thereby allowing a user to observe excellent images.

In order to achieve the above object, an image display apparatus according to an embodiment of the present invention comprises a light source for supplying illumination light, a reflection type display element for modulating the illumination light into image light by reflecting the illumination light, an illumination optical system for guiding the illumination light to the reflection type display element, and a projection optical system for guiding the image light to an observer, wherein the image light is incident on the projection optical system via at least a portion of the illumination optical system. In this arrangement, the illumination optical system has a part, in an area where both the illumination light and the image light pass, which changes an optical action depending on a state of incident light. The part which changes its optical action depending on the state of incident light has the function of deflecting the illumination light to decrease an incident angle with respect to the reflection type display element as compared with a case where the part does not exist.

According to another aspect of the present invention, the image display apparatus of one embodiment of the present invention is characterized by having a diffraction optical part in the area, in the illumination optical system, where both illumination light and image light pass.

DETAILED DESCRIPTION OF THE PREFERRED EMBODIMENTS (First Embodiment)

Figure 1:
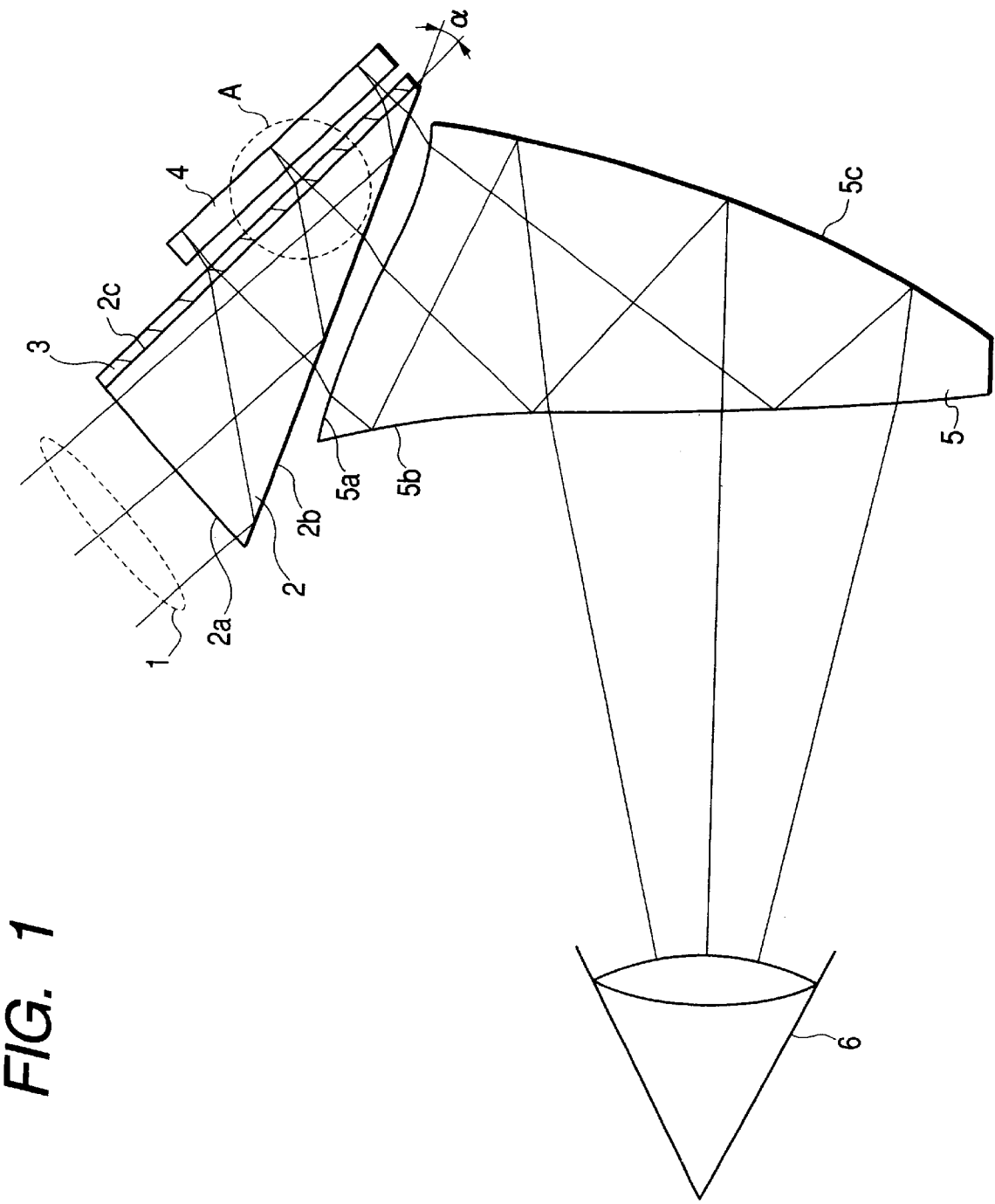
FIG. 1 is a view showing the arrangement of an image display apparatus according to the first embodiment of the present invention.

FIG. 1 shows an image display apparatus according to the first embodiment of the present invention. The image display apparatus according to this embodiment is suitably used for a head-mounted display (HMD) or the like which is mounted on the head portion of an observer. Referring to FIG. 1, illumination light 1 is emitted from a light source (not shown), and an illumination prism 2 receives the illumination light 1 from the light source. A hologram element 3 (diffraction optical element) forms a light guide (illumination) optical system together with the illumination prism 2. This apparatus also includes a reflection type optical modulation element (reflection type image display element) 4 and prism lens (projection optical system) 5. FIG. 1 also shows an eye 6 of the observer.

Although not shown, the light source is formed by an existing emitter such as a fluorescent tube, light-emitting diode (LED), laser diode (LD), or electroluminescence (EL) element and an optical system or the like placed between the emitter and the illumination prism 2 as needed.

The illumination prism 2 is a prism member having three surfaces 2a, 2b, and 2c. The hologram element 3 is formed near or integrally with the surface 2c. As the hologram element 3, a volume hologram element is especially suitable.

The reflection type optical modulation element 4 is designed to modulate incident light in accordance with an image signal supplied from the signal processing circuit of an image information output apparatus such as a PC or DVD player (not shown). As this element, for example, an element which has pivotal micromirrors arranged one-dimensionally or two-dimensionally and modulates incident light by changing the reflecting direction or an element for modulating incident light by changing the diffusion characteristics of the light is used. Note that the above image information output apparatus and the image display apparatus of this embodiment constitute an image display system.

The prism lens 5 is a prism member having three surfaces 5a, 5b, and 5c. At least one of these surfaces is an aspherical surface, a so-called free-form surface having no rotating axis of symmetry. Note that the assignee has proposed similar prism lenses in Japanese Laid-Open Patent Application No. 7-333551 (corresponding to EP 0687932A3), Japanese Laid-Open Patent Application No. 8-50256, Japanese Laid-Open Patent Application No. 8-234136 (corresponding to U.S. Pat. No. 5,689,736), and Japanese Laid-Open Patent Application No. 8-234137 (corresponding to U.S. Pat. No. 5,706,136).

In the image display apparatus having the above arrangement, the illumination light 1 from the light source enters the illumination prism 2 from the surface 2a of the illumination prism 2 and is reflected by the surface 2b. The reflected light is diffracted by the hologram element 3 formed on the surface 2c to illuminate the reflection type optical modulation element 4. The light (image light) modulated/reflected by the reflection type optical modulation element 4 enters the prism lens 5 from the surface 5a of the prism lens 5 via the hologram element 3 and the surfaces 2c and 2b of the illumination prism 2. The image light is reflected by the surfaces 5b and 5c and emerges from the surface 5b to reach the eye 6 of the observer.

In this embodiment, the hologram element 3 and the surface 2b which is a reflecting surface are arranged in an area where both the optical path of illumination light emitted from the light source and reaching the reflection type optical modulation element 4 and the optical path of image light propagating from the reflection type optical modulation element 4 to the observer pass. Note that a metal or dielectric reflecting film may be formed on the surface 5c of the prism lens 5, whereas total reflection preferably occurs at the surface 5b.

In this case, when the image light is reflected by the surface 5b, total reflection preferably occurs at least at a portion of the reflecting area in terms of a reduction in light loss. In addition, as is obvious from FIG. 1, on the surface 5b, the area where the image light is reflected and the area where the light is transmitted are formed as smoothly continuous surfaces, and at least portions of these areas overlap each other.

On the optical path of the illumination light, the illumination light 1 from the light source is reflected once by the surface 2b of the illumination prism 2 for the following reason. By folding the optical path, the illumination prism 2 is reduced in size, and the inclination of the reflection type optical modulation element 4 with respect to the surface 5a of the prism lens 5 is decreased to allow them to be placed as near as possible. Reflection at the surface 2b is preferably total reflection in terms of a reduction in light loss. If the total reflection condition is not satisfied in an area of the surface 2b through which light from the reflection type optical modulation element 4 is not transmitted, a metal or dielectric reflecting film may be formed in this area.

Figure 2:
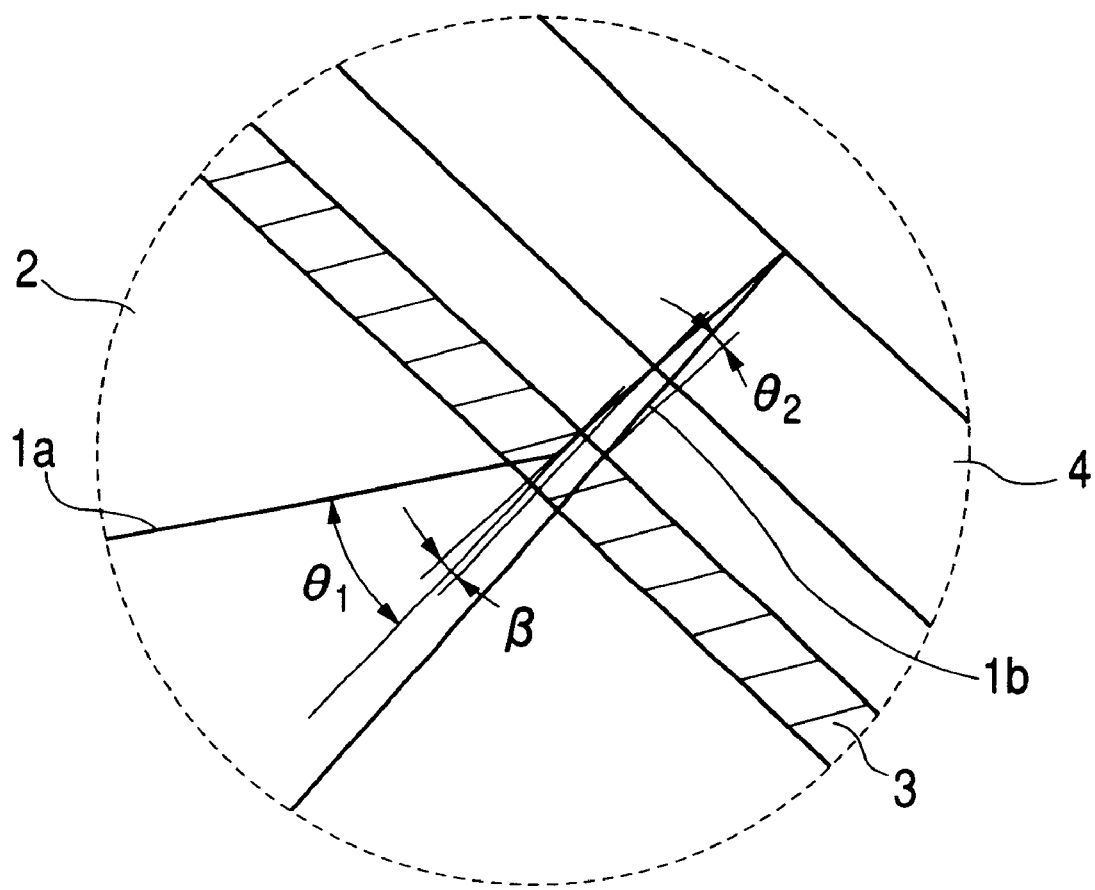
FIG. 2 is a partially enlarged view of the image display apparatus according to the first embodiment.

The function of the hologram element 3 will be described below. FIG. 2 is an enlarged view of a portion A surrounded by the dashed line and located near the hologram element 3 in FIG. 1. Referring to FIG. 2, light 1a, of the illumination light 1 emitted from the light source and reaching the reflection type optical modulation element 4, which is reflected by the surface 2b of the illumination prism 2 is incident on the hologram element 3 at an angle θ1. Light 1b, of image light propagating from the reflection type optical modulation element 4 to the eye 6 of the observer, which is incident on the hologram element 3 has an incident angle θ2 different from θ1.

If the hologram element 3 is formed by a volume hologram element, unique angle selectively can be provided.

More specifically, characteristics can be provided for the hologram element 3 to exhibit a strong diffraction effect with respect to only light having a specific incident angle but hardly produce diffracted light having incident angles different from the specific angle. In this embodiment, the hologram element 3 is manufactured to increase the diffraction efficiency for light having an incident angle near θ1, which is given by $$|\theta 1|>|\theta 2| \quad (1)$$

Note that the characteristics of the hologram element need not be uniform throughout the entire surface, and may be made nonuniform depending on the differences between incident angles at the incident positions of light.

If θ1 can be set to be large as in this embodiment, an angle α defined by the surfaces 2b and 2c of the illumination prism 2 in FIG. 1 can be decreased to reduce the size of the apparatus.

The α defined by the surfaces 2b and 2c of the illumination prism 2 is preferably 20° or less. If this angle exceeds 20°, the inclination of the reflection type optical modulation element 4 with respect to the prism lens 5 becomes too large to properly maintain the optical performance based on a curvature of field, distortion, astigmatism, and the like throughout the entire surface. In addition, it becomes difficult to increase the field angle, pupil size, or eye relief.

Furthermore, as shown in FIG. 2, owing the diffraction effect of the hologram element 3, even if the incident angle θ1 of the illumination light 1a onto the hologram element 3 is large, an incident angle β of the illumination light 1a onto the reflection type optical modulation element 4 can be decreased (the light can be made to strike the reflection type optical modulation element 4 almost vertically) as compared with a case where the hologram element 3 is not present. Even with the use of a reflection type optical modulation element having high incident angle dependence, a decrease in the contrast of a displayed image can be suppressed.

(Second Embodiment)

Figure 3:
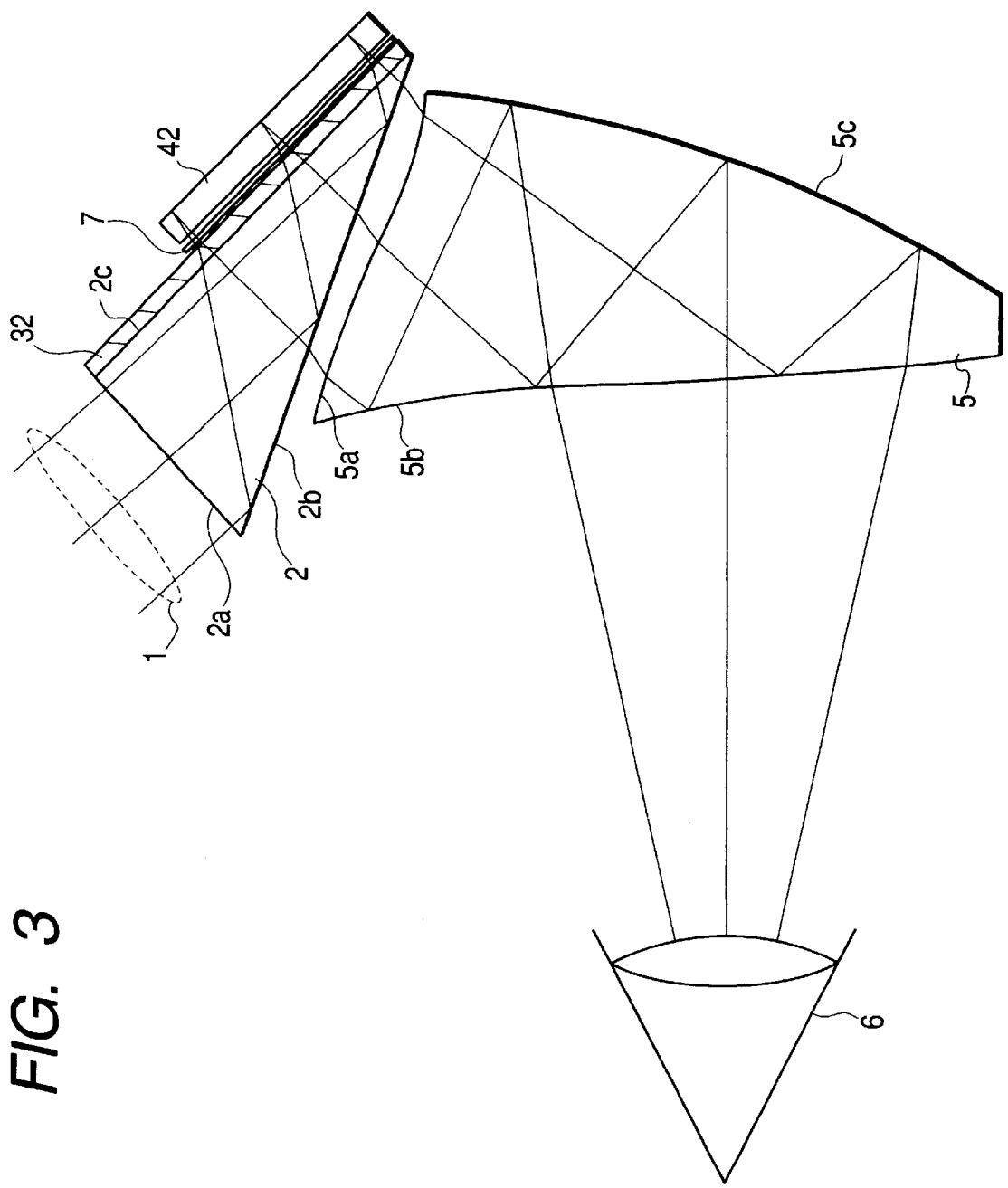
FIG. 3 is a view showing the arrangement of an image display apparatus according to the second embodiment of the present invention.

FIG. 3 shows an image display apparatus according to the second embodiment of the present invention. The same reference numerals as in FIG. 3 denote the same parts in the first embodiment.

This embodiment differs from the first embodiment in that a reflection type liquid crystal element 42 is used as an image display means, and a polarizing element 7 that allows only predetermined polarized light to pass therethrough is placed on the front surface of the element. A hologram element 32 has angle selectivity as in the first embodiment.

The reflection type liquid crystal display element 42 of this embodiment is used in a mode (normally black mode) in which each pixel is set in a dark state without application of a voltage. The single polarizing element 7 serves as both a polarizer on the incident side and an analyzer on the exist side of the reflection type liquid crystal display element 42.

The reflection type liquid crystal display element 42 displays an image in accordance with an image signal supplied from the signal processing circuit of an image information output apparatus such as a PC or DVD player (not shown) (the same applies to the following embodiments). Note that the above image information output apparatus and the image display apparatus of this embodiment constitute an image display system.

In the image display apparatus of this embodiment, illumination light 1 from a light source is guided to the hologram element 32 by an illumination prism 2. The illumination light incident on the hologram element 32 is diffracted to reach the polarizing element 7, and only polarized light in a predetermined direction, e.g., a direction perpendicular to the drawing surface, is transmitted through the polarizing element 7 to illuminate the reflection type liquid crystal display element 42. The light (image light) modulated/reflected by the reflection type liquid crystal display element 42 is incident on the polarizing element 7 again, and only a polarized light component in the direction perpendicular to the drawing surface is transmitted through the polarizing element 7 to strike the hologram element 32 again.

As in the first embodiment, since the incident angle of the image light incident from the reflection type liquid crystal display element 42 onto the hologram element 32 differs from the incident angle of the illumination light 1 incident from the prism lens 2 side, the image light is directly transmitted through the hologram element 32 without being influenced by the diffraction effect and strikes a prism lens 5. Subsequently, the image light reaches an eye 6 of an observer in the same manner as in the first embodiment.

This embodiment uses the reflection type liquid crystal display element 42 as an image display means but utilizes angle selectivity with respect to the incident angle of light on the hologram element 32 as in the first embodiment.

As a reflection type liquid crystal display element, a TN (Twisted Nematic) liquid crystal is preferably used. However, other liquid crystals such as an STN (Super Twisted Nematic) liquid crystal, ferroelectric liquid crystal, and antiferroelectric liquid crystal may be used. As an TFT arrangement, an arrangement using amorphous silicon, polysilicon, or the like can be used. As a substrate, a member made of glass, quartz, single-crystal silicon, or the like can be used. The same applies to reflection type liquid crystal display elements used in other embodiments to be described below.

In this embodiment, as in the first embodiment, since the incident angle of illumination light on the hologram element 32 can be set to be large, the angle defined by surfaces 2b and 2c of the prism lens 2 can be set to be small. This makes it possible to attain a reduction in apparatus size.

In addition, owing to the diffraction effect of the hologram element 32, even if the incident angle of the illumination light 1 on the hologram element 32 is large, the incident angle of the illumination light 1 on the reflection type liquid crystal display element 42 can be set to be small (the light can be made to strike the reflection type liquid crystal display element 42 almost vertically) as compared with a case where no hologram element 32 is present. This makes it possible to suppress a decrease in the contrast of a displayed image even if the incident angle dependence of the reflection type liquid crystal display element 42 is high.

(Third Embodiment)

Figure 4:
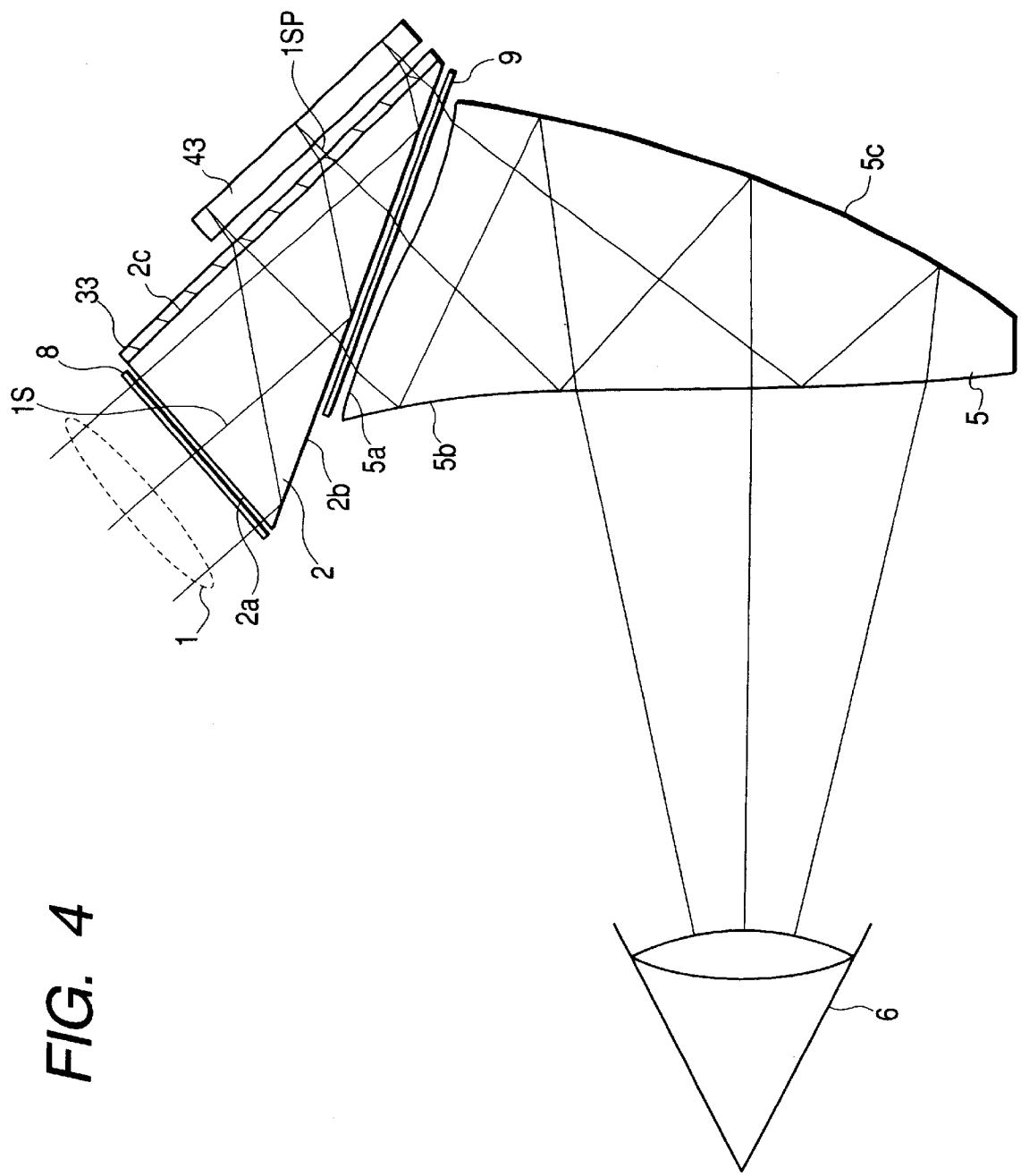
FIG. 4 is a view showing the arrangement of an image display apparatus according to the third embodiment of the present invention.

FIG. 4 shows an image display apparatus according to the third embodiment of the present invention. The same reference numerals as in FIG. 4 denote constituent elements having the same functions in the respective embodiments described above.

In this embodiment, a reflection type liquid crystal display element 43 is used as an image display element, a first polarizing element 8 is placed in front of an incident surface 2a of an illumination prism 2, and a second polarizing element 9 is placed between the illumination prism 2 and a prism lens 5. The first polarizing element 8 has polarization selectivity that allow light polarized in a direction perpendicular to the drawing surface of FIG. 4 (S-polarized light) to pass therethrough, whereas the second polarizing element 9 has polarization selectivity that allows light polarized in a direction perpendicular to this direction (P-polarized light) to pass therethrough.

The reflection type liquid crystal display element 43 is used in a mode (normally white mode) in which each pixel is set in a bright state without application of a voltage.

A hologram element 33 has the property of exhibiting a strong diffraction effect for incident S-polarized light but exert almost no diffraction effect on P-polarized light perpendicular to the S-polarized light.

In the image display apparatus of this embodiment, only S-polarized light 1S of illumination light 1 from the light source is extracted by the first polarizing element 8 and transmitted through the surface 2a of the illumination prism 2. This light is reflected by a surface 2b and incident on the hologram element 33 formed on a surface 2c. Since the hologram element 33 exhibits a strong diffraction effect for only S-polarized light as described above, the S-polarized light 1S is diffracted and incident on the reflection type liquid crystal display element 43.

Image light 1SP that is reflected by the reflection type liquid crystal display element 43 and emerges therefrom reaches the hologram element 33 again. This image light 1SP is modulated by the reflection type liquid crystal display element 43 such that the polarizing direction is rotated in accordance with the brightness of an image to be displayed by each pixel, and contains P- and S-polarized light components.

Of the image light 1SP, the P-polarized light component that contributes to image formation is almost free from the diffraction effect of the hologram element 33, and hence is transmitted through the hologram element 33 to reach the second polarizing element 9 via the surfaces 2c and 2b of the illumination prism 2. Since the second polarizing element 9 allows the P-polarized light to pass therethrough, the P-polarized light as image light reaches an eye 6 of an observer via the prism lens 5.

The S-polarized light component contained in the image light 1SP is diffracted by the hologram element 33, enters the illumination prism 2 through the surface 2c, and is reflected by the surface 2b or transmitted therethrough to reach the second polarizing element 9 so as to be absorbed. As a consequence, the S-polarized light does not strike the prism lens 5 and exerts no influence on a displayed image.

As described above, this embodiment utilizes the fact that the hologram element 33 exhibits different diffraction effects depending on the polarizing direction of incident light.

In this embodiment, as in the first embodiment, since the incident angle of illumination light on the hologram element 33 can be set to be large, the angle defined by the surfaces 2b and 2c of the illumination prism 2 can be decreased, thus attaining a reduction in apparatus size.

In addition, owing to the diffraction effect of the hologram element 33, even if the incident angle of the illumination light 1S on the hologram element 33 is large, the incident angle of the illumination light 1S on the reflection type liquid crystal display element 43 can be set to be small (the light can be made to strike the reflection type liquid crystal display element 43 almost vertically) as compared with a case where no hologram element 33 is present. This makes it possible to suppress a decrease in the contrast of a displayed image even if the incident angle dependence of the reflection type liquid crystal display element 43 is high.

In this embodiment, the illumination light 1S incident on the illumination prism 2 is polarized light (S-polarized light) perpendicular to the drawing surface. However, the present invention is not limited to this. The first polarizing element may be changed to make polarized light parallel to the drawing surface (P-polarized light) strike the illumination prism, and the hologram element 33 and reflection type liquid crystal display element 43 or second polarizing element 9 may be replaced with elements having the corresponding characteristics.

If there is an area on the surface 2b of the illumination prism 2 in which the total reflection condition is not satisfied, S-polarized light is preferably used in this area in terms of efficiency because such an area generally exhibits higher reflectance for S-polarized light than for P-polarized light.

(Fourth Embodiment)

Figure 5:
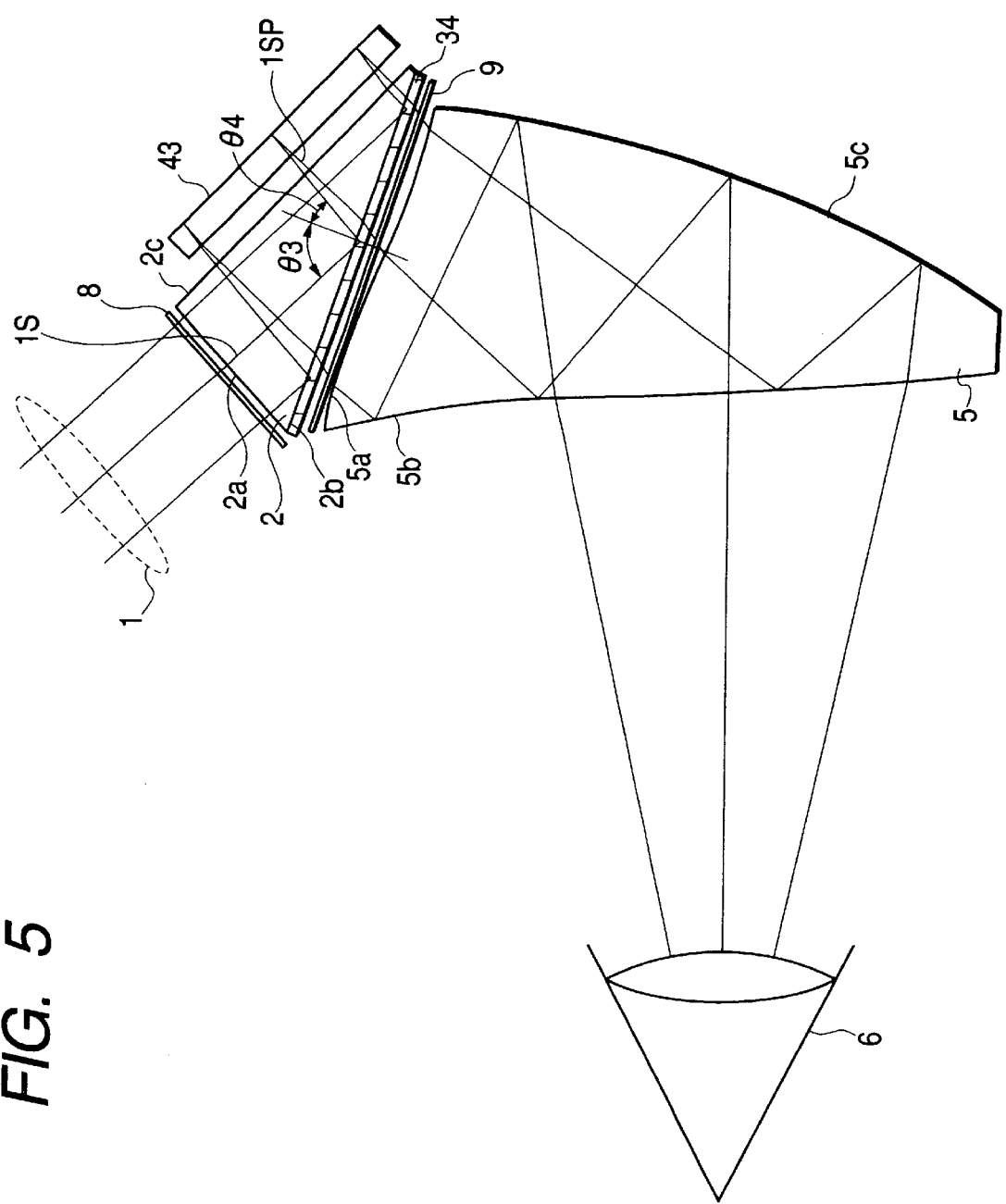
FIG. 5 is a view showing the arrangement of an image display apparatus according to the fourth embodiment of the present invention.

FIG. 5 shows an image display apparatus according to the fourth embodiment of the present invention. The same reference numerals as in FIG. 5 denote constituent elements having the same functions in the respective embodiments described above.

In this embodiment, a hologram element 34 is integrally formed with an illumination prism 2 on a surface 2b instead of a surface 2c. This hologram element 34 has the property of exerting a strong reflection/diffraction effect on polarized light perpendicular to the drawing surface of FIG. 5, i.e., S-polarized light incident on the hologram element 34, and exhibiting almost no diffraction effect with respect to P-polarized light, which is polarized light perpendicular to the S-polarized light, and hence allowing it to pass therethrough.

In the image display apparatus of this embodiment, only S-polarized light 1S perpendicular to the drawing surface of FIG. 5 extracted from illumination light 1 from the light source is extracted by a first polarizing element 8 and transmitted through a surface 2a of an illumination prism 2. Thereafter, the light is transmitted through the surface 2b and incident on the hologram element 34. Since the hologram element 34 exhibits a strong reflection/diffraction effect with respect to S-polarized light perpendicular to the drawing surface as described above, the S-polarized light 1S is reflected/diffracted and transmitted through the surface 2c to be incident on the reflection type liquid crystal display element 43.

Image light 1SP that is reflected by the reflection type liquid crystal display element 43 and emerges therefrom is transmitted through the surfaces 2c and 2b of the illumination prism 2 and incident on the hologram element 34. This image light 1SP is modulated by a reflection type liquid crystal display element 43 such that the polarizing direction is rotated in accordance with the brightness of an image to be displayed by each pixel, and contains P- and S-polarized light components.

Of the image light 1SP, the P-polarized light component that contributes to image formation is almost free from the diffraction effect of the hologram element 34, and hence is transmitted through the hologram element 34 to reach an eye 6 of an observer via the second polarizing element 9 and a prism lens 5.

On the other hand, the S-polarized light component contained in the image light 1SP is reflected/diffracted by the hologram element 34 or absorbed by a second polarizing element 9 even if it is transmitted through the hologram element 34. Therefore, this light component is not incident on the prism lens 5, and exerts no influence on a displayed image.

If the hologram element 34 exerts a sufficient reflection effect on S-polarized light, the second polarizing element 9 may not be used.

As described above, this embodiment utilizes the fact that the reflection type hologram element used as the hologram element 34 exhibits different diffraction effects depending on the polarizing direction of incident light.

As shown in FIG. 5, the hologram element 34 has the property of exerting a reflection/diffraction effect on illumination light such that an incident angle θ3 and reflection angle θ4 satisfy $$|\theta 3|>|\theta 4| \qquad (2)$$

Therefore, the angle defined by the surfaces 2b and 2c of the illumination prism 2 can be decreased, and the apparatus size can be reduced. In addition, owing to the diffraction effect of the hologram element 34, even if the incident angle of the illumination light 1S on the hologram element 34 is large, the incident angle of the illumination light 1S on the reflection type liquid crystal display element 43 can be set to be small (the light can be made to strike the reflection type liquid crystal display element 43 almost vertically) as compared with a case where no hologram element 34 is present and the light is regularly reflected by a plane mirror. This makes it possible to suppress a decrease in the contrast due to the incident angle dependence of the reflection type liquid crystal display element.

Note that in this embodiment, the single reflection type hologram element has both the function of reducing the size of the apparatus by using the reflection/diffraction effect of the hologram element 34 with respect to illumination light instead of the reflection effect of the surface 2b of the illumination prism 2 as in the first to third embodiments, and the function of decreasing the incident angle of illumination light on the reflection type liquid crystal display element 43 owing to the above reflection/diffraction effect.

(Fifth Embodiment)

Figure 6:
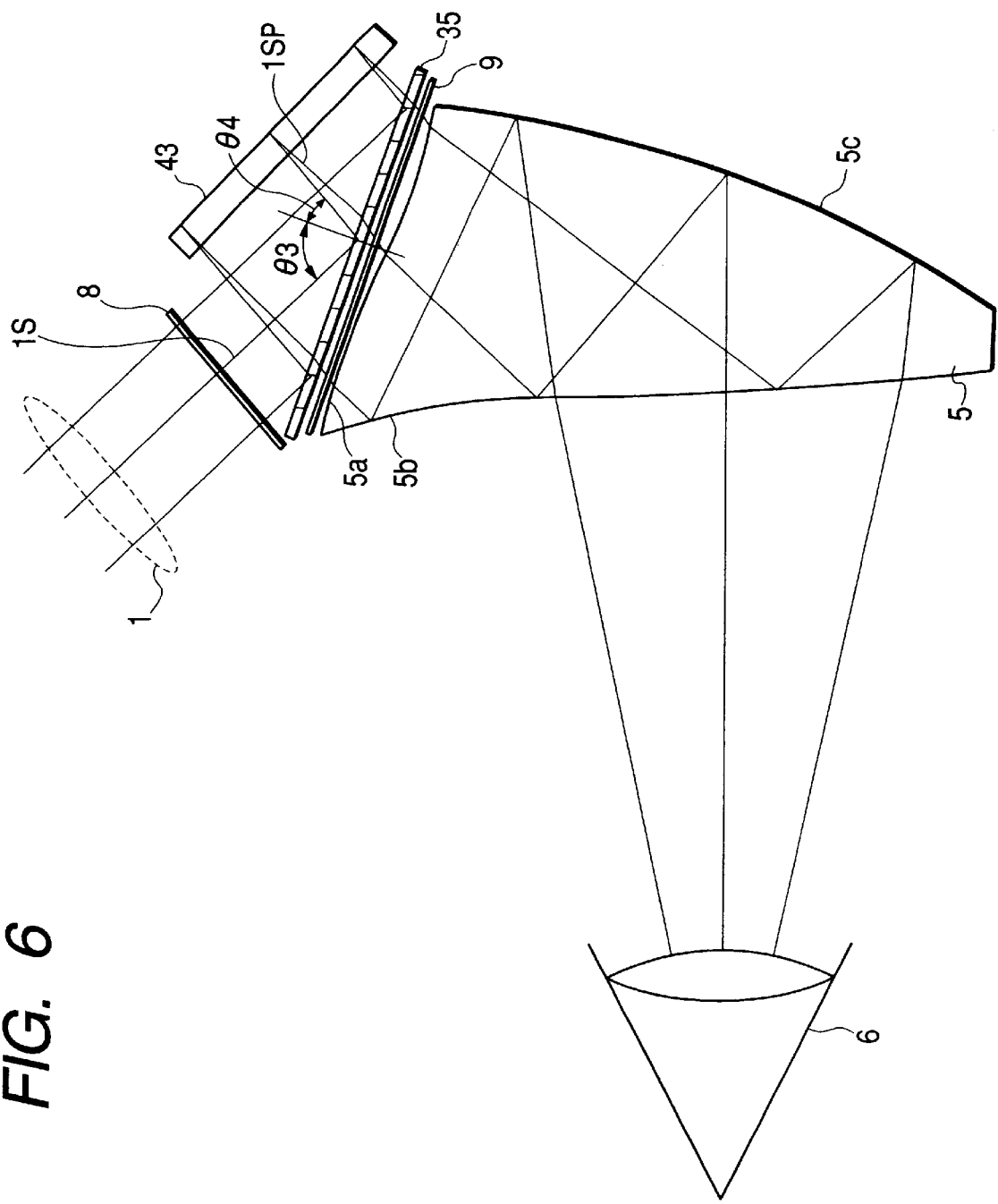
FIG. 6 is a view showing the arrangement of an image display apparatus according to the fifth embodiment of the present invention.

FIG. 6 shows an image display apparatus according to the fifth embodiment of the present invention. The same reference numerals as in FIG. 6 denote constituent components having the same functions in the respective embodiments described above.

In this embodiment, the illumination prism 2 is omitted, and only a hologram element 35 is placed between a reflection type liquid crystal display element 43 and a second polarizing element 9. Like the hologram element 34 in the fourth embodiment, the hologram element 35 has the property of exerting a strong reflection/diffraction effect on only polarized light perpendicular to the drawing surface of FIG. 6, i.e., S-polarized light incident on the hologram element 35, and exhibiting almost no diffraction effect with respect to P-polarized light, which is polarized light perpendicular to the S-polarized light, and hence allowing it to pass therethrough.

That is, the function of the hologram element 35 is the same as that of the hologram element 34 in the fourth embodiment; illumination light 1 from the light source is converted into S-polarized light 1S having a polarized light component perpendicular to the drawing surface of FIG. 6 by a first polarizing element 8, reflected/diffracted by the hologram element 35, and incident on the reflection type liquid crystal display element 43.

In this case, an incident angle θ3 and reflection angle θ4 of the S-polarized light 1S incident on the reflection type liquid crystal display element 43 satisfy inequality (2) as in the fourth embodiment.

Therefore, the angle defined by the hologram element 35 and the reflection type liquid crystal display element 43 can be decreased, and a reduction in apparatus size can be attained.

Of image light 1SP that is reflected by the reflection type liquid crystal display element 43 and emerges therefrom, the P-polarized light component that contributes to image formation is transmitted through the hologram element 35 and reaches an eye 6 of an observer via the second polarizing element 9 and prism lens 5.

Owing to the diffraction effect of the hologram element 35, even if the incident angle of the illumination light 1S on the hologram element 35 is large, the incident angle of the illumination light 1S on the reflection type liquid crystal display element 43 can be set to be small (the light can be made to strike the reflection type liquid crystal display element 43 almost vertically) as compared with a case where a plane mirror is used in place of the hologram element 35 and the light is regularly reflected. This makes it possible to prevent a decrease in the contrast due to the incident angle dependence of the reflection type liquid crystal display element.

In this embodiment, since there is no need to use an illumination prism like the one in each embodiment described above, there is no light loss caused by reflection on the surface of the illumination prism, and a bright image can be displayed. In addition, the number of parts required decreases to attain a reduction in manufacturing cost.

(Sixth Embodiment)

Figure 7:
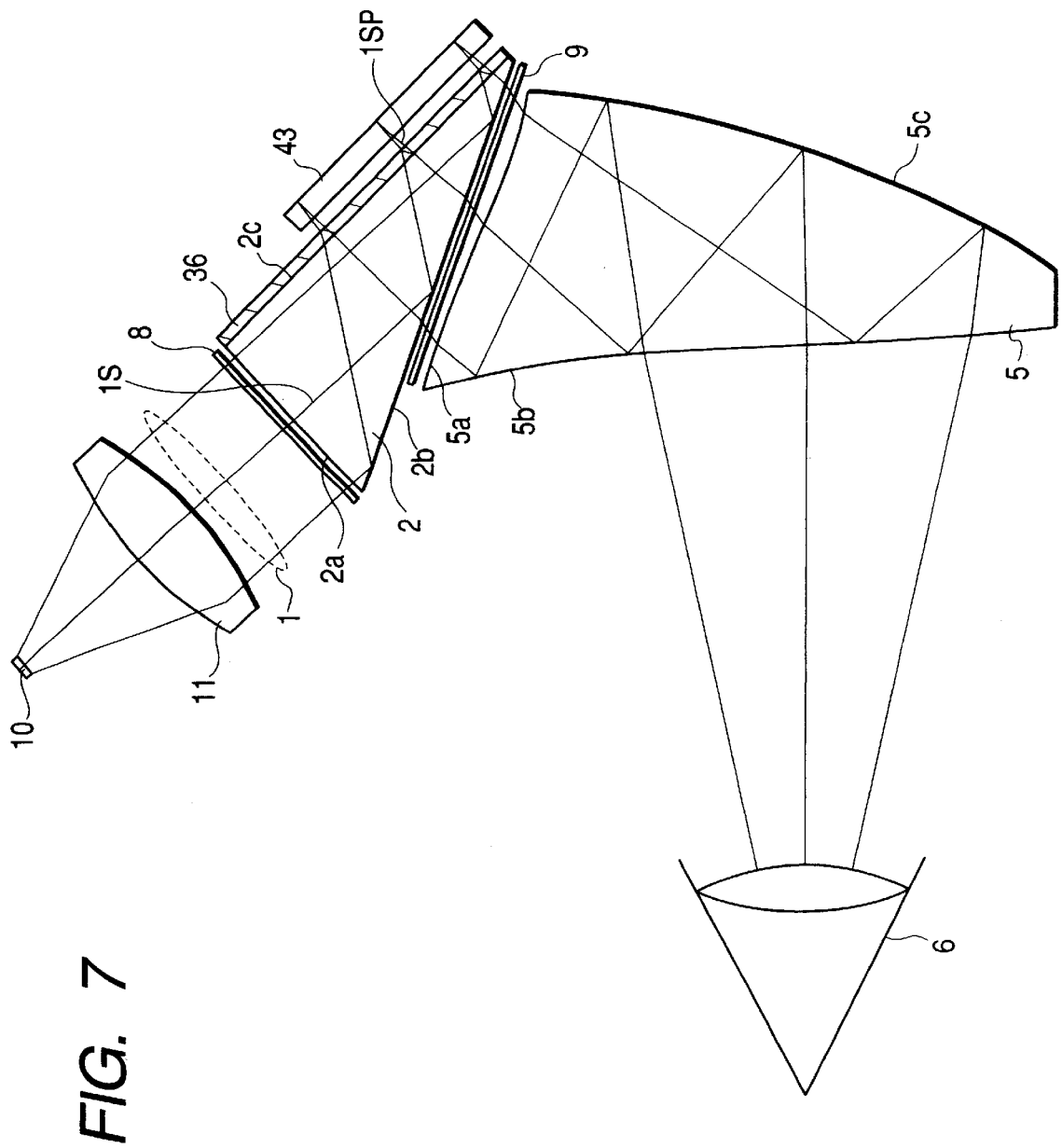
FIG. 7 is a view showing the arrangement of an image display apparatus according to the sixth embodiment of the present invention.

FIG. 7 shows an image display apparatus according to the sixth embodiment of the present invention. The same reference numerals as in FIG. 7 denote constituent elements having the same functions in the respective embodiments described above.

This embodiment is a modification of the third embodiment. A light source is comprised of a light-emitting diode (LED) 10 for emitting light in a narrow wavelength region and a condenser lens 11. A hologram element 36 has the property of exhibiting a strong diffraction effect with respect to the emission wavelength region of the LED 10 and S-polarized light.

Illumination light from the LED 10 is substantially collimated by the condenser lens 11, and only S-polarized light 1S perpendicular to the drawing surface of FIG. 7 is extracted by a first polarizing element 8. Thereafter, the light propagates along an optical path similar to the one in the third embodiment, and an observer can observe a displayed monochrome image.

In this embodiment, since the LED with the narrow wavelength region is used as an illumination light source, the hologram element 36 may be designed to diffract only light in the wavelength region. The diffraction efficient can therefore be increased as compared with the third embodiment, and a bright observation image can be obtained.

(Seventh Embodiment)

Figure 8:
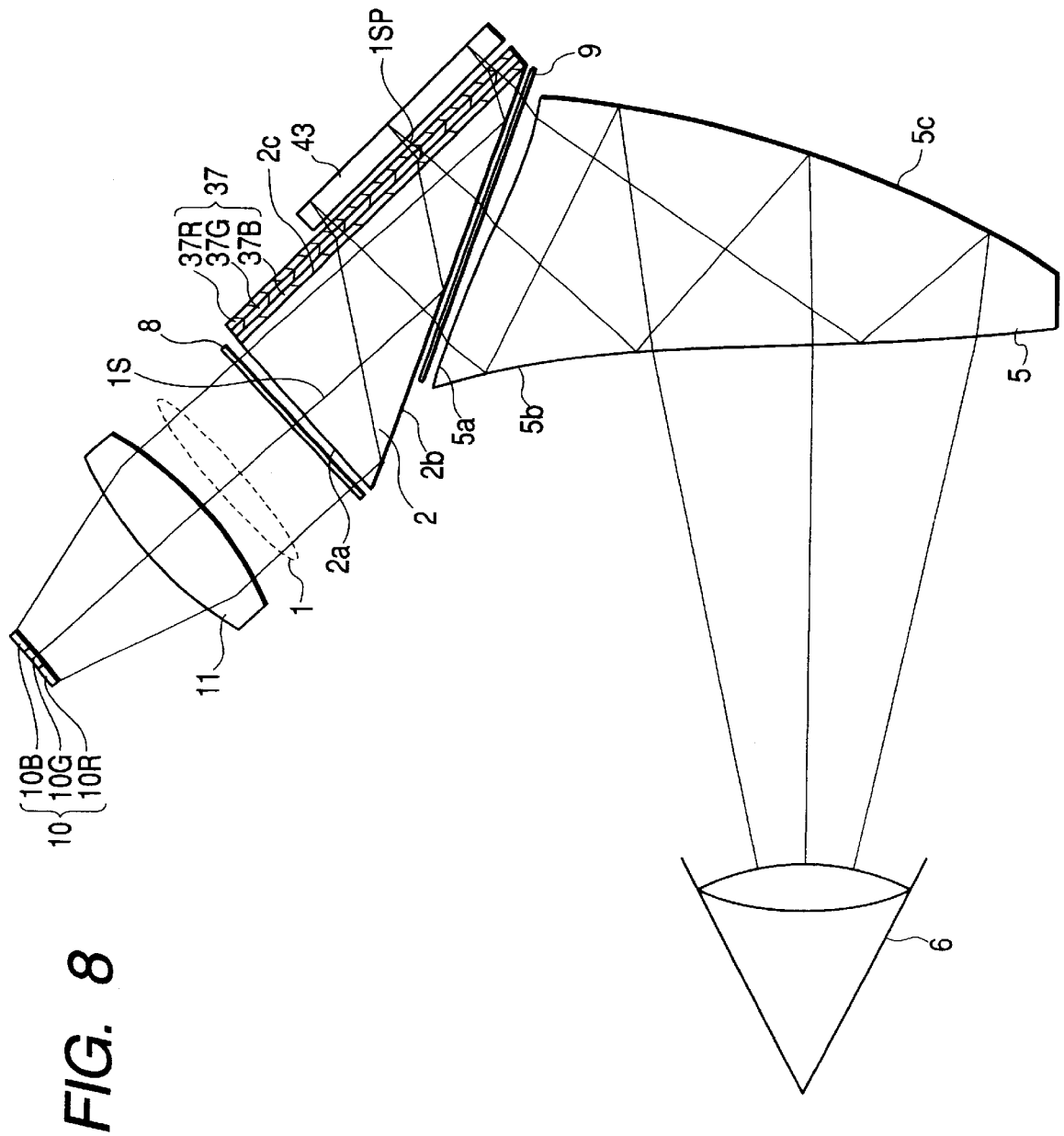
FIG. 8 is a view showing the arrangement of an image display apparatus according to the seventh embodiment of the present invention.

FIG. 8 shows an image display apparatus according to the seventh embodiment of the present invention. The same reference numerals as in FIG. 8 denote constituent elements having the same functions in the respective embodiments described above.

This embodiment is a modification of the third embodiment. As a light source, an LED 10 having three light-emitting portions 10R, 10G, and 10B for emitting light beams in three wavelength regions, e.g., red (R), green (G), and blue (B) light beams, is used. These light-emitting portions 10R, 10G, and 10B can be independently turned on in a time-series manner. A hologram element 37 is formed by stacking three layers 37R, 37G, and 37B corresponding to the light-emitting portions 10R, 10G, and 10B.

In the image display apparatus of this embodiment, illumination light from the three light-emitting portions 10R, 10G, and 10B of the LED 10 is substantially collimated by a condenser lens 11, and a first polarizing element 8 makes only S-polarized light 1S perpendicular to the drawing surface of FIG. 8 enter an illumination prism 2 through a surface 2a. This S-polarized light 1S is reflected by the surface 2b and reaches the hologram element 37 on the surface 2c.

The three layers 37R, 37G, and 37B constituting the hologram element 37 respectively have the properties of exhibiting a strong diffraction effect for only the wavelength region of light emitted from the three light-emitting portions 10R, 10G and 10B and S-polarized light. If, for example, light from the light-emitting portion 10R is incident on the hologram element 37, this light is diffracted by only the layer 37R of the hologram element 37 and is transmitted through the remaining layers 37G and 37B to illuminate a reflection type liquid crystal display element 43. Likewise, light beams from the remaining light-emitting portions 10G and 10B are diffracted by only the layers 37G and 37B of the hologram element 37 to illuminate the reflection type liquid crystal display element 43.

Since each layer of the hologram element 37 is required to have a diffraction effect for only a small wavelength region, a high diffraction efficiency can be obtained as in the sixth embodiment.

In addition, in this embodiment, the reflection type liquid crystal display element 43 displays images corresponding to the respective wavelength regions of the LED 10 at predetermined intervals in a time-series manner, and the respective light-emitting portions 10R, 10G, and 10B are synchronously controlled to emit light beams to illuminate the reflection type liquid crystal display element 43. This makes it possible to perform so-called field-sequential full-color display.

Referring to FIG. 8, the three light-emitting portions 10R, 10G, and 10B are arranged to be flush with the drawing surface. However, they may be arranged in a direction perpendicular to the drawing surface. In consideration of control on light beams by the condenser lens 11, the three light-emitting portions 10R, 10G, and 10B are preferably arranged as near as possible; an LED formed by encapsulating three light-emitting portions in one package is suitable.

Although discrete LEDS may be used as the three light-emitting portions 10R, 10G, and 10B, the differences between the positions of the respective LEDs become large. This may cause problems, e.g., a decrease in illumination efficiency, nonuniformity, and a reduction in observable pupil region. In this embodiment, however, the characteristics of the three layers 37R, 37G, and 37B of the hologram element 37 can be optimized in accordance with the positions of the respective light-emitting portions 10R, 10G, and 10B, and hence this problem can be avoided, thereby realizing high-efficient, uniform illumination of a wide observable pupil region.

In addition, this embodiment uses the element obtained by stacking three holograms as the hologram element 37. If, however, one hologram element may replace them as long as it has a sufficient diffraction effect throughout the entire required emission wavelength region of the light source. Furthermore, if multiple exposure is performed in the process of manufacturing a hologram, one hologram element can have characteristics corresponding to a plurality of wavelength regions.

Note that the hologram elements used in the first to seventh embodiments are manufactured and duplicated by using photosensitive materials such as silver halide, gelatin bichromate, and photopolymer.

(Eighth Embodiment)

Figure 9:
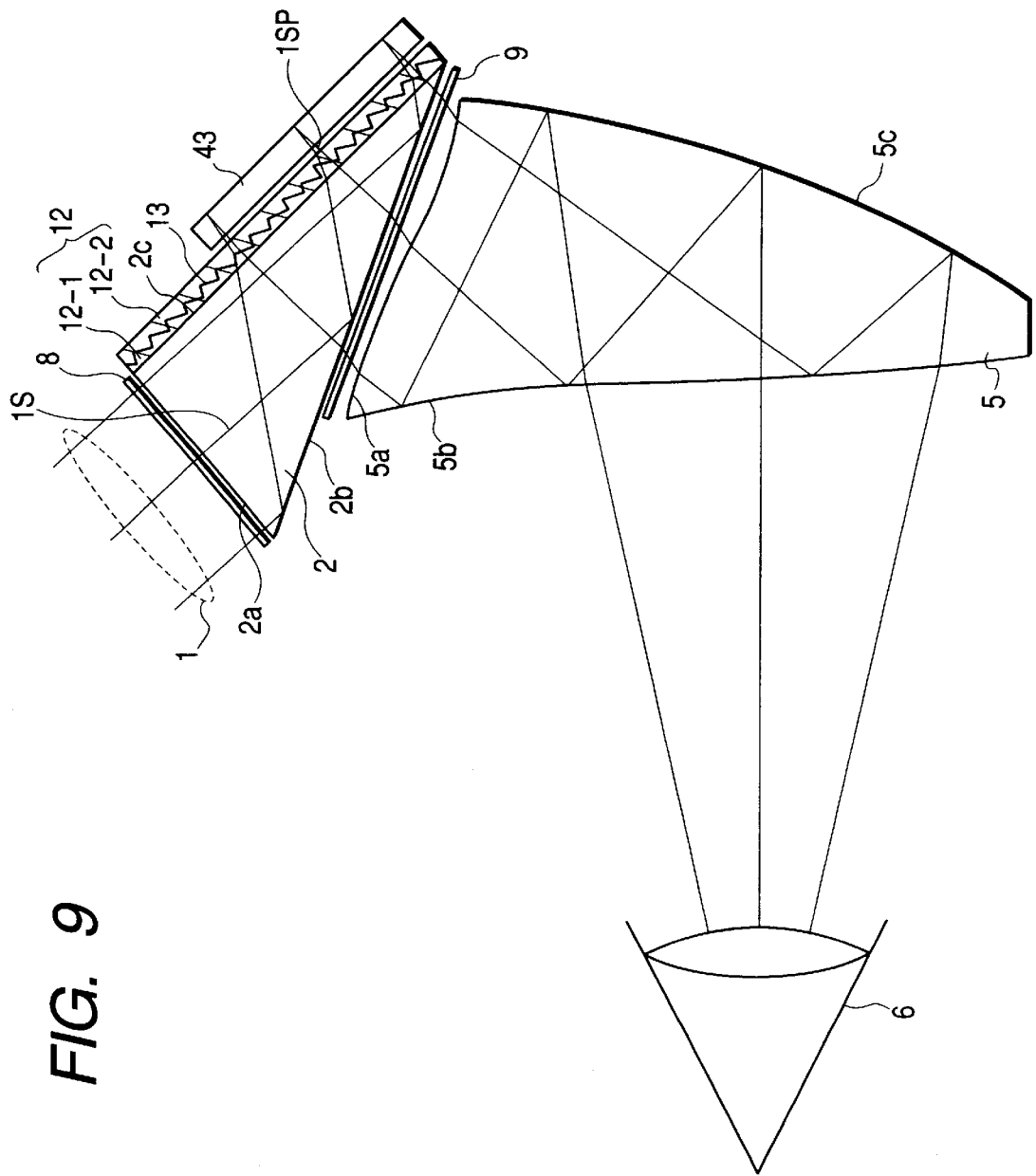
FIG. 9 is a view showing the arrangement of an image display apparatus according to the eighth embodiment of the present invention.

FIG. 9 shows an image display apparatus according to the eighth embodiment of the present invention. The same reference numerals as in FIG. 9 denote constituent elements having the same functions in the respective embodiments described above.

In this embodiment, in place of the hologram element used in the third embodiment, a birefringent diffraction optical element 12 is formed near or integrally with a surface 2c of an illumination prism 2.

The birefringent diffraction optical element 12 has a relief structure having first and second layers 12-1 and 12-2 formed on both sides of a boundary 13 having a sawtooth cross-section. The first layer 12-1 is made of an isotropic material with a refractive index n1. The second layer 12-2 is made of a birefringent material having the refractive index n1 with respect to P-polarized light, which is polarized within the drawing surface of FIG. 9, and a refractive index n2 with respect to S-polarized light perpendicular to the P-polarized light.

The refractive indices n1 and n2 satisfy $$n1 > n2 \tag{3}$$

Note that the first layer 12-1 may be made of the same material as that for the illumination prism 2 and directly formed on the surface 2c of the illumination prism 2 to have a sawtooth shape. With this structure, the illumination prism 2 and sawtooth shape can be simultaneously molded by a mold using a resin or glass, thereby simplifying the structure and reducing the manufacturing cost.

In the image display apparatus of this embodiment, a first polarizing element 8 extracts only S-polarized light 1S in a direction perpendicular to the drawing surface of FIG. 9 from the illumination light 1 from the light source. The S-polarized light is transmitted through a surface 2a of the illumination prism 2 and reflected by a surface 2b and strikes the birefringent diffraction optical element 12 formed on the surface 2c.

With the above structure, the birefringent diffraction optical element 12 serves as a diffraction grating having a sawtooth cross-section with respect to the S-polarized light 1S in the direction perpendicular to the drawing surface because of the refractive index difference between the first and second layers 12-1 and 12-2 (n1−n2>0), and the incident S-polarized light 1S is diffracted and incident on the reflection type liquid crystal display element 43.

In this case, the incident angle (θ1) of the S-polarized light 1S on the first layer 12-1 of the birefringent diffraction optical element 12 and the incident angle (β) of the S-polarized light 1S on a reflection type liquid crystal display element 43 which is subject to the diffraction effect of the birefringent diffraction optical element 12 and transmitted therethrough satisfy inequality (1) as in the first embodiment.

The polarized light 1S incident on the reflection type liquid crystal display element 43 is reflected by the reflection type liquid crystal display element 43 and emerges as image light 1SP. The image light 1SP is modulated by the reflection type liquid crystal display element 43 such that the polarizing direction is rotated in accordance with the brightness of an image to be displayed on each pixel, and contains P- and S-polarized light components. Although this image light 1SP reaches the birefringent diffraction optical element 12 again, since there is no refractive index difference between the first and second layers 12-1 and 12-2 with respect to the P-polarized light component (n1−n1=0), they exert no diffraction effect and allows the incident P-polarized light component which is polarized in the direction contributing to image formation to pass therethrough.

The P-polarized light component transmitted through the birefringent diffraction optical element 12 reaches an eye 6 of an observer via the surfaces 2c and 2b of the illumination prism 2, a second polarizing element 9, and a prism lens 5 as in the other embodiments.

With respect to the S-polarized light contained in the image light 1SP, the birefringent diffraction optical element 12 functions as a diffraction grating as in a case where light is incident from the illumination prism 2 side, and hence the S-polarized light is diffracted and transmitted through the surface 2c of the illumination prism 2. This light is then reflected by the surface 2b or transmitted therethrough to reach the second polarizing element 9 to be absorbed. For this reason, the S-polarized light is not incident on the prism lens 5 and exerts no influence on a displayed image.

The pitch and depth of the grating of the birefringent diffraction optical element 12 used in this embodiment are determined by the blazed condition for guiding illumination light to the reflection type liquid crystal display element 43 at a predetermined angle.

As the birefringent diffraction optical element 12, not only an element having a one-dimensional structure but also an element having a two-dimensional structure whose grating line is determined as an arcuated line, elliptic line, or the like in consideration of design in accordance with the divergent/convergent state of illumination light may be used.

In addition, the birefringent diffraction optical element 12 in this embodiment is based on inequality (3). However, even if the relationship in magnitude between the two refractive indices and the inclination of the diffraction grating surface in this embodiment are reversed, the same function and effect can be obtained.

Furthermore, the first layer may be made of a birefringent material, and the second layer is made of an isotropic material. As a birefringent material, a liquid crystal, liquid crystal polymer, organic film, or the like can be suitably used as well as a crystal.

(Ninth Embodiment)

Figure 10:
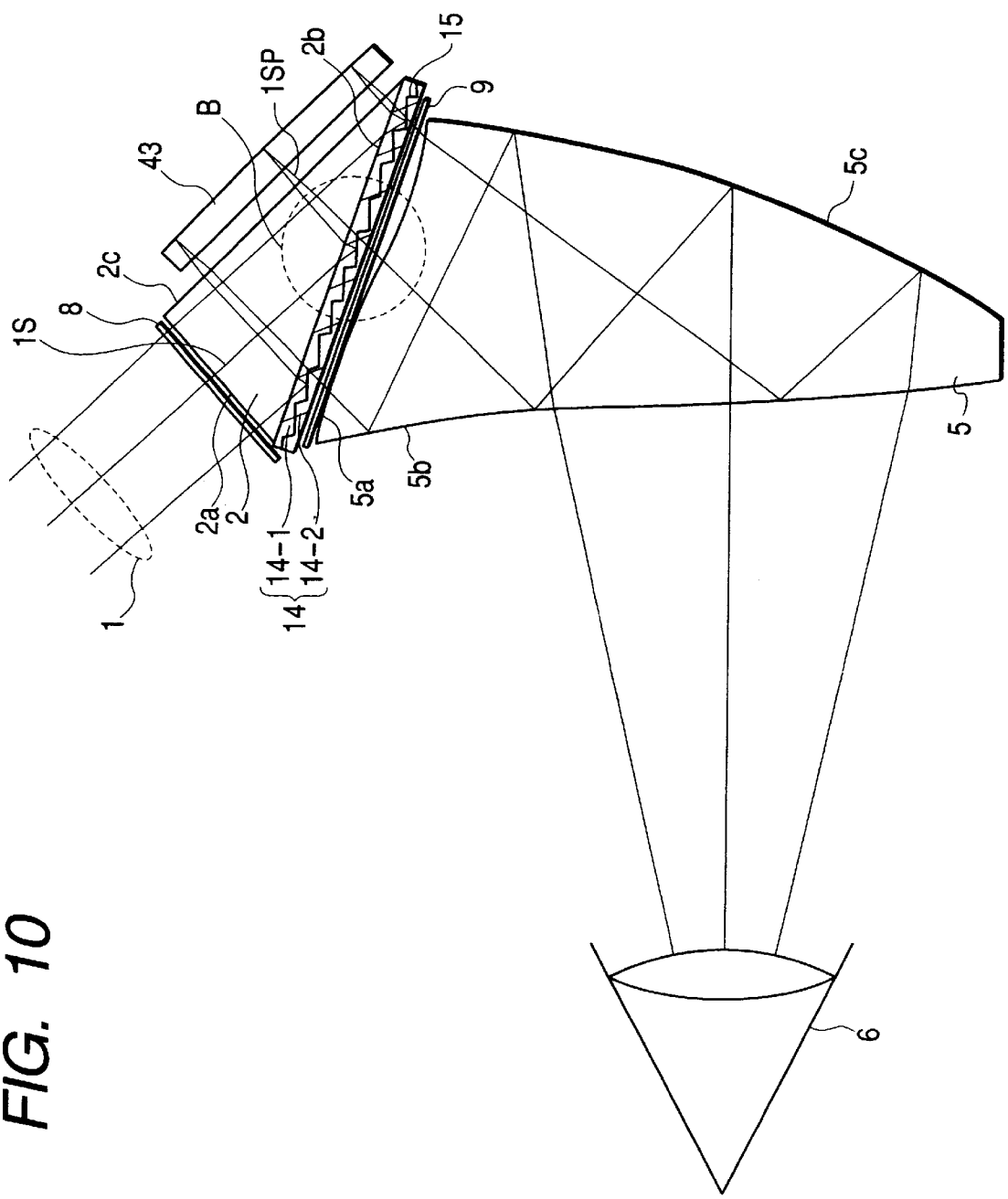
FIG. 10 is a view showing the arrangement of an image display apparatus according to the ninth embodiment of the present invention.

FIG. 10 shows an image display apparatus according to the ninth embodiment of the present invention. The same reference numerals as in FIG. 10 denote constituent elements having the same functions in the respective embodiments described above.

In this embodiment, a reflection type birefringent diffraction optical element 14 is formed on a surface 2b of an illumination prism 2 in place of the hologram element in the fourth embodiment.

Like the birefringent diffraction optical element 12 in the eighth embodiment, the reflection type birefringent diffraction optical element 14 has first and second layers 14-1 and 14-2 formed on both sides of a boundary 15 having a sawtooth cross-section.

The first layer 14-1 is made of an isotropic material with a refractive index n3. The second layer 14-2 is made of a birefringent material having the refractive index n3 with respect to P-polarized light polarized within the drawing surface of FIG. 10 and a refractive index n4 with respect to S-polarized light perpendicular to the P-polarized light. The refractive indices n3 and n4 satisfy $$n3 > n4 \tag{4}$$

In the image display apparatus of this embodiment, a first polarizing element 8 extracts only S-polarized light 1S in a direction perpendicular to the drawing surface of FIG. 10 from the illumination light 1 from the light source. The S-polarized light enters the illumination prism 2 through a surface 2a and is transmitted through the surface 2b to strike the reflection type birefringent diffraction optical element 14.

Figure 11:
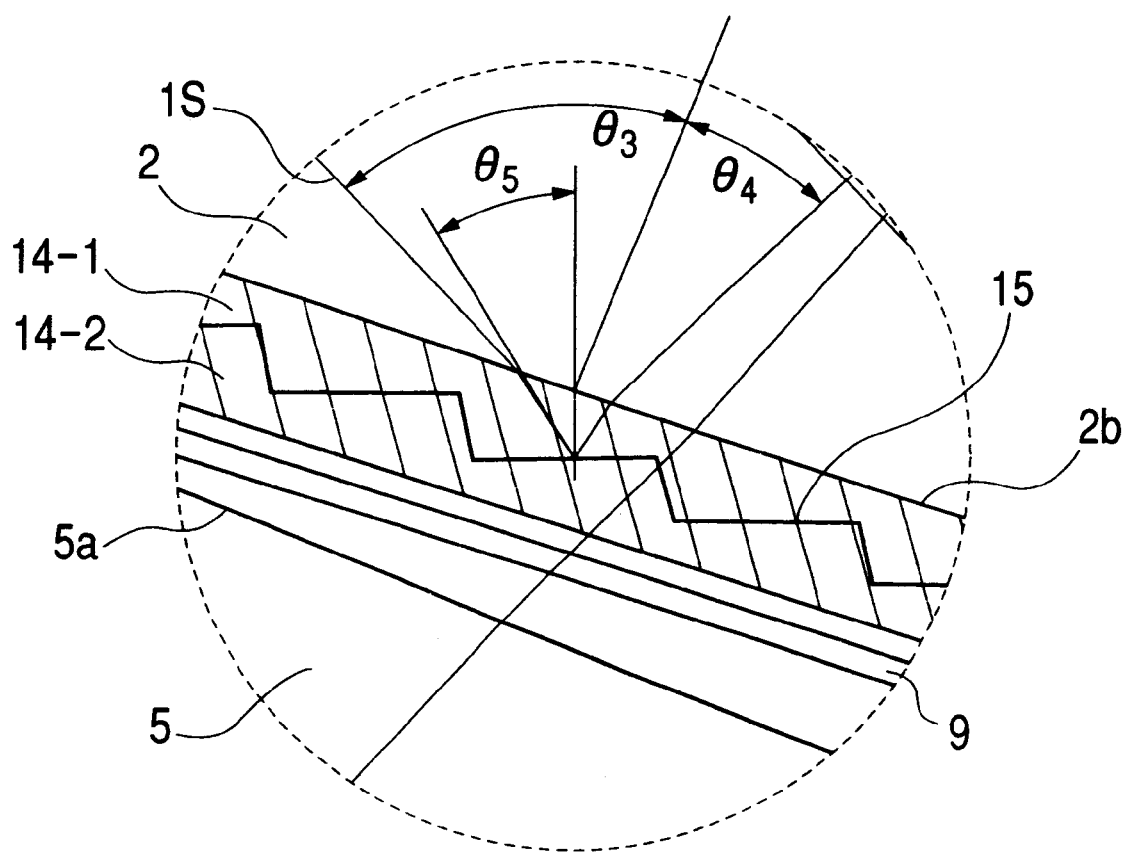
FIG. 11 is a partial enlarged view of the image display apparatus according to the ninth embodiment of the present invention.

FIG. 11 shows an enlarged view of a portion B surrounded with the dashed line in FIG. 10 to described this state in detail. Referring to FIG. 11, letting θ5 be the incident angle of light on the inclined grating surface of the boundary 15 between the two layers 14-1 and 14-2 of the reflection type birefringent diffraction optical element 14, θ5 satisfies the following condition with respect to n3 and n4:

$$\theta 5 \geq \sin^{-1}(n4/n3) \tag{5}$$

Inequality (5) represents a total reflection condition at the inclined grating surface of the boundary 15 between the two layers 14-1 and 14-2 of the reflection type birefringent diffraction optical element 14. Referring to FIG. 10, the S-polarized light 1S that satisfies this condition and strikes the reflection type birefringent diffraction optical element 14 is totally reflected and diffracted by the inclined grating surface to strike a reflection type liquid crystal display element 43 via the surfaces 2b and 2c of the illumination prism 2.

Letting θ3 be the incident angle of the S-polarized light 1S incident on the first layer 14-1 of the reflection type birefringent diffraction optical element 14, and θ4 be the incident angle of the S-polarized light 1S incident from the reflection type birefringent diffraction optical element 14 onto the reflection type liquid crystal display element 43, these incident angles satisfy inequality (2) as in the fourth embodiment.

Image light 1SP that is reflected by the reflection type liquid crystal display element 43 and emerges therefrom is transmitted through the surfaces 2c and 2b of the illumination prism 2 and reaches the reflection type birefringent diffraction optical element 14 again. This image light 1SP is modulated by the reflection type liquid crystal display element 43 such that the polarizing direction is rotated in accordance with the brightness of an image to be displayed on each pixel, and contains P- and S-polarized light components.

Of this image light 1SP, the P-polarized light component that contributes to image formation is transmitted through the boundary surface without any change because the two layers 14-1 and 14-2 of the reflection type birefringent diffraction optical element 14 are media having the same refractive index n3. Thereafter, the light component reaches an eye 6 of an observer via a second polarizing element 9 and prism lens 5 as in the other embodiments.

On the other hand, the S-polarized light component contained in the image light 1SP is totally reflected by the reflection type birefringent diffraction optical element 14 and propagates to the surface 2a or is transmitted through the reflection type birefringent diffraction optical element 14 to be absorbed by the second polarizing element 9. For this reason, this light component is not incident on the prism lens 5 and exerts no influence on a displayed image.

The pitch and depth of the grating of the reflection type birefringent diffraction optical element 14 in this embodiment are determined by the blazed condition for guiding illumination light to the reflection type liquid crystal display element 43 at a predetermined angle. In addition, the first layer 14-1 of the reflection type birefringent diffraction optical element 14 may be made of the same material as that for the illumination prism 2 and directly formed on the surface 2b of the illumination prism 2 to have a sawtooth shape. With this structure, the illumination prism 2 and sawtooth shape can be simultaneously molded by a mold using a resin or glass, thereby simplifying the structure and reducing the manufacturing cost.

Figure 12:
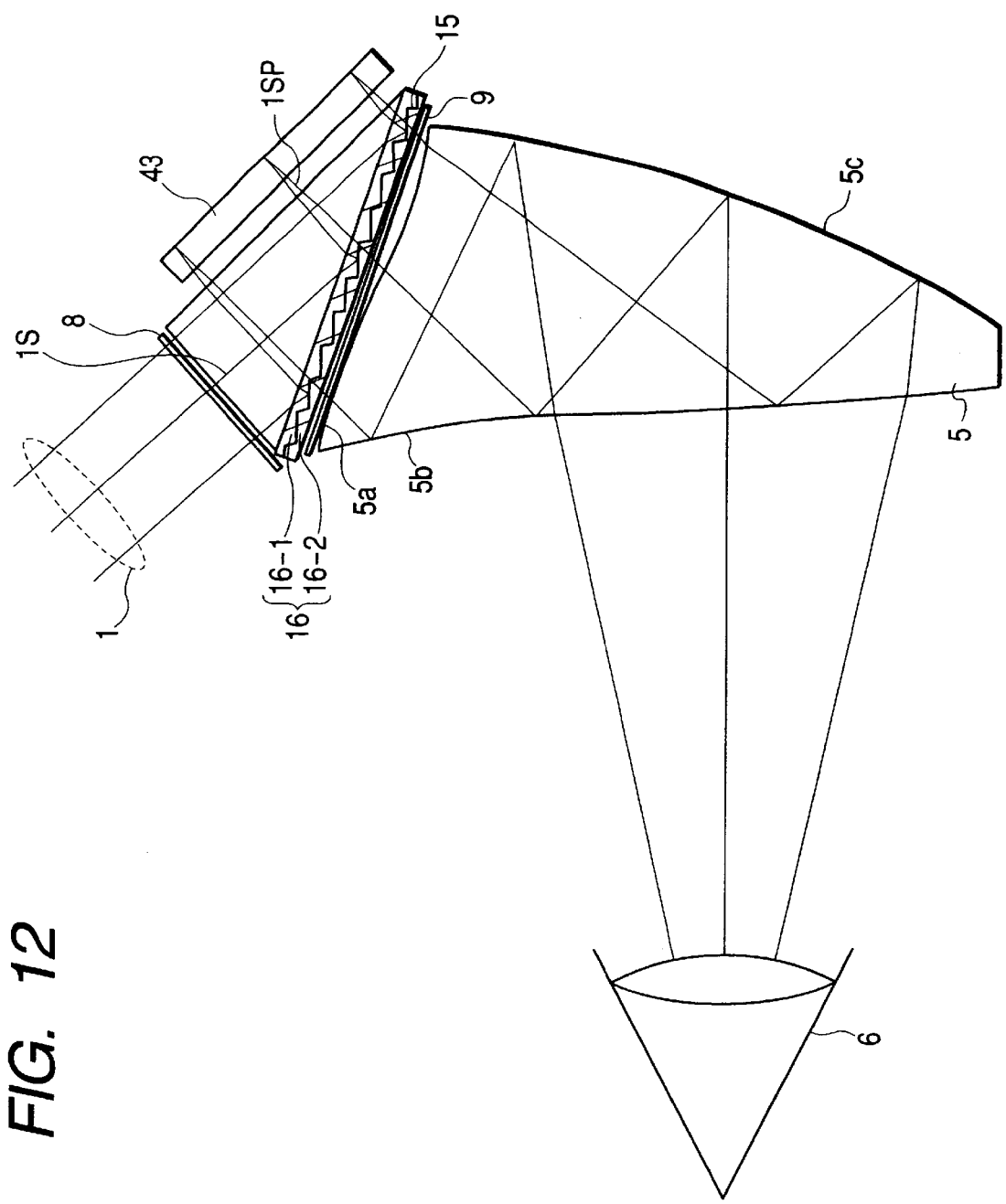
FIG. 12 is a view showing the arrangement of a modification of the image display apparatus according to the ninth embodiment of the present invention.

Furthermore, as shown in FIG. 12, an element 16 having the same function as that of the reflection type birefringent diffraction optical element 14 in this embodiment may be singly placed between the reflection type liquid crystal display element 43 and the second polarizing element 9 without using the illumination prism 2.

(Tenth Embodiment)

Figure 13:
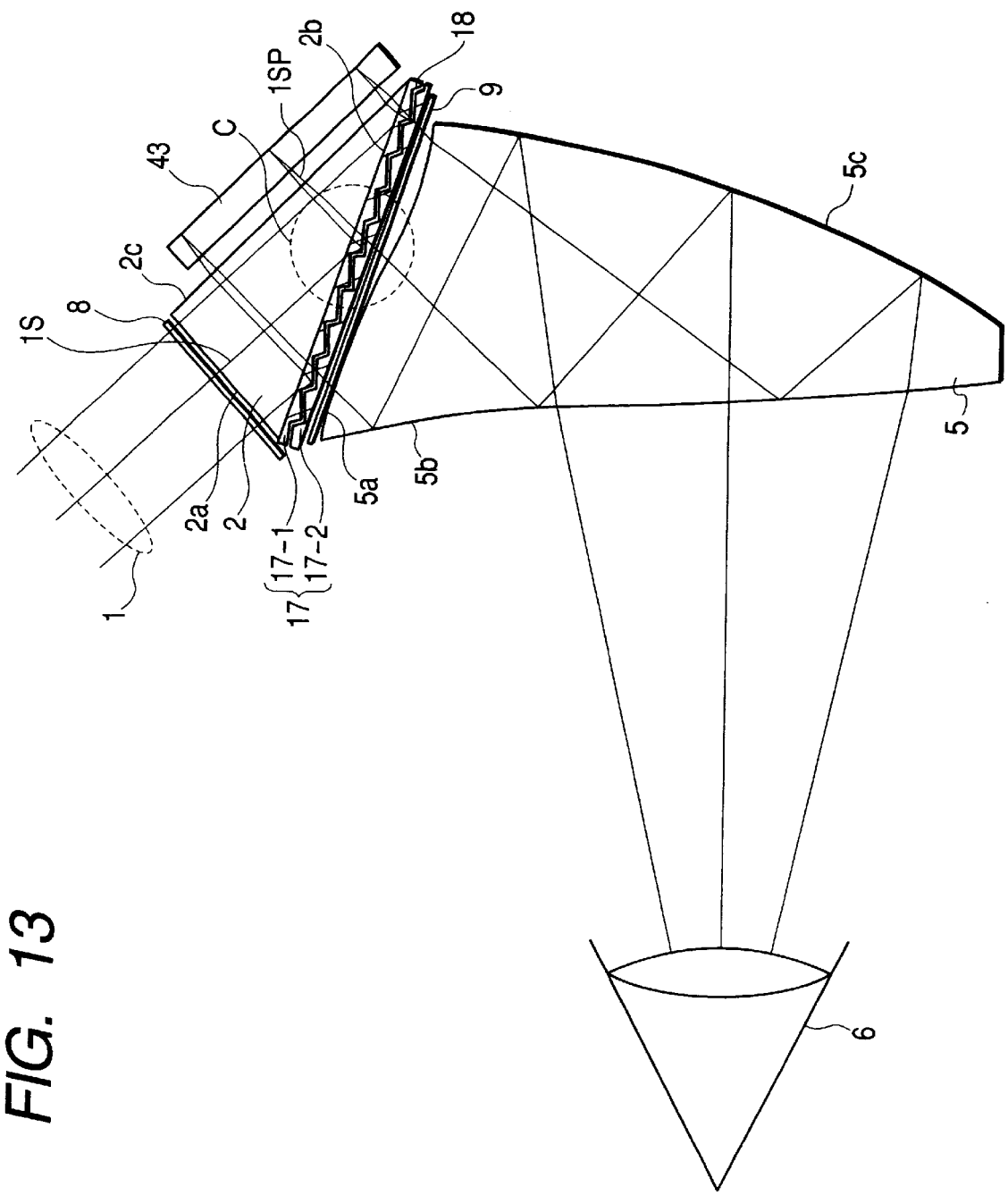
FIG. 13 is a view showing the arrangement of an image display apparatus according to the tenth embodiment of the present invention.

FIG. 13 shows an image display apparatus according to the tenth embodiment of the present invention. The same reference numerals as in FIG. 13 denote constituent elements having the same functions in the respective embodiments described above.

In this embodiment, a reflection type diffraction optical element 17 is formed on a surface 2b of an illumination prism 2 in place of the hologram element in the fourth embodiment.

As shown in FIG. 13, the reflection type diffraction optical element 17 is designed such that first and second layers 17-1 and 17-2, each having a sawtooth cross-section, are arranged through a slight gap 18. The first and second layers 17-1 and 17-2 have the same refractive index n5.

In the image display apparatus of this embodiment, a first polarizing element 8 extracts only S-polarized light 1S in a direction perpendicular to the drawing surface of FIG. 13 from illumination light 1 from the light source. The S-polarized light enters the illumination prism 2 through a surface 2a and is transmitted through the surface 2b to strike the reflection type diffraction optical element 17.

Figure 14:
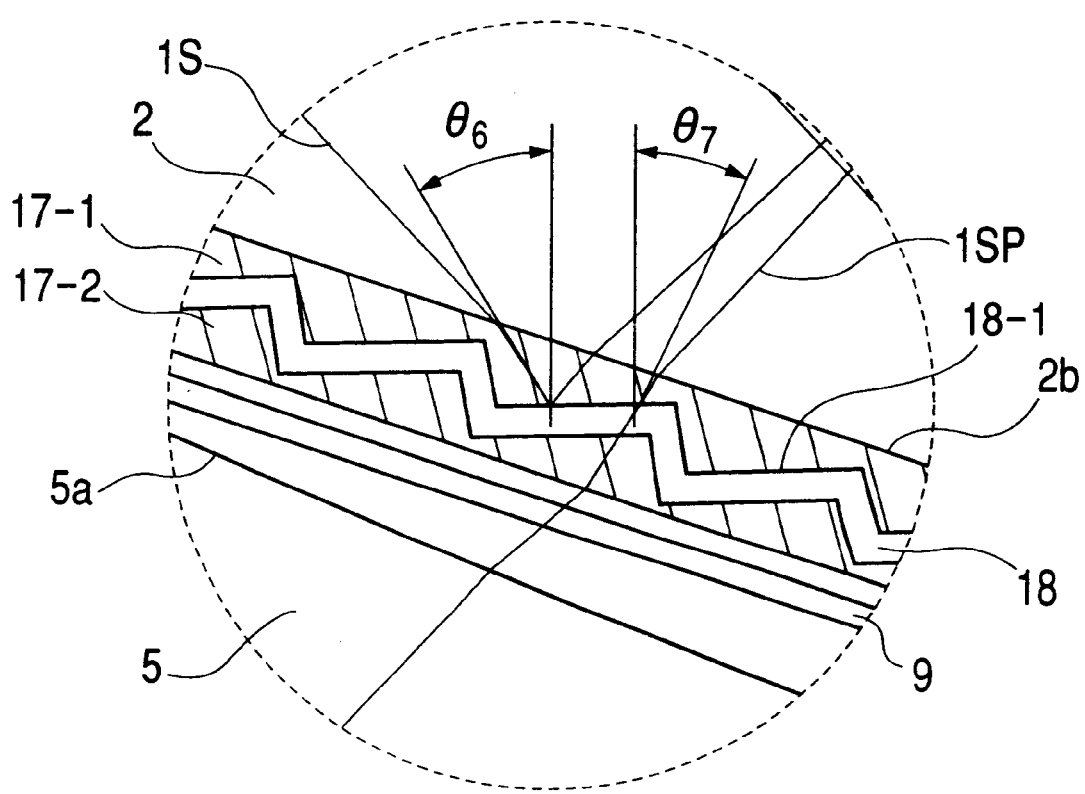
FIG. 14 is a partial enlarged view of the image display apparatus according to the tenth embodiment of the present invention.

FIG. 14 shows an enlarged view of a portion C surrounded with the dashed line in FIG. 13 to describe this state in detail. Referring to FIG. 14, letting θ6 be the incident angle of light on an inclined grating surface 18-1 of the first layer 17-1 of the reflection type diffraction optical element 17, θ6 satisfies the following inequality with respect to the refractive index n5:

$$\theta 6 \geq \sin^{-1}(1/n5) \qquad (6)$$

Inequality (6) represents a total reflection condition at the inclined grating surface 18-1 of the first layer 17-1 of the reflection type diffraction optical element 17. The incident S-polarized light 1S that satisfies this condition is totally reflected and diffracted by the inclined grating surface to strike a reflection type liquid crystal display element 43 via the surface 2b and a surface 2c of the illumination prism 2, as shown in FIG. 13.

Letting θ3 be the incident angle of the S-polarized light 1S incident on the first layer 17-1 of the reflection type diffraction optical element 17, and θ4 be the incident angle of the S-polarized light 1S incident from the reflection type diffraction optical element 17 onto the reflection type liquid crystal display element 43, these incident angles satisfy inequality (2).

Image light 1SP that is reflected by the reflection type liquid crystal display element 43 and emerges therefrom is transmitted through the surfaces 2c and 2b of the illumination prism 2 and reaches the reflection type diffraction optical element 17 again. In this case, as shown in FIG. 14, the incident angle of image light 1SP on the inclined grating surface 18-1 of the first layer 17-1 of the reflection type diffraction optical element 17 becomes θ7 which is smaller than the θ6, and hence does not satisfy a total reflection condition. That is, $$\theta 7 < \sin^{-1}(1/n5) \qquad (7)$$

The image light 1SP is therefore transmitted through the reflection type diffraction optical element 17 without being reflected, and reaches an eye 6 of an observer via the second layer 17-2 of the reflection type diffraction optical element 17, a second polarizing element 9, and a prism lens 5 as in the other embodiments.

The pitch and depth of the grating of the reflection type diffraction optical element 17 used in this embodiment are determined by the blazed condition for guiding illumination light to the reflection type liquid crystal display element 43 at a predetermined angle. In addition, the first layer 17-1 of the reflection type diffraction optical element 17 may be made of the same material as that for the prism lens 2 and directly formed on the surface 2b of the prism lens to have a sawtooth shape. With this structure, the illumination prism 2 and sawtooth shape can be simultaneously molded by a mold using a resin or glass, thereby simplifying the structure and reducing the manufacturing cost.

The reflection type diffraction optical element 17 of this embodiment may be singly placed between the reflection type liquid crystal display element 43 and the second polarizing element 9 without using the prism lens 2 as in the modification of the ninth embodiment shown in FIG. 12.

In this embodiment, the reflection type liquid crystal display element 43 is used as an image display means. As in the first embodiment, however, a reflection type optical modulation element using no polarized light may be used. In this case, the polarizing elements 8 and 9 are not required.

(Eleventh Embodiment)

Figure 15:
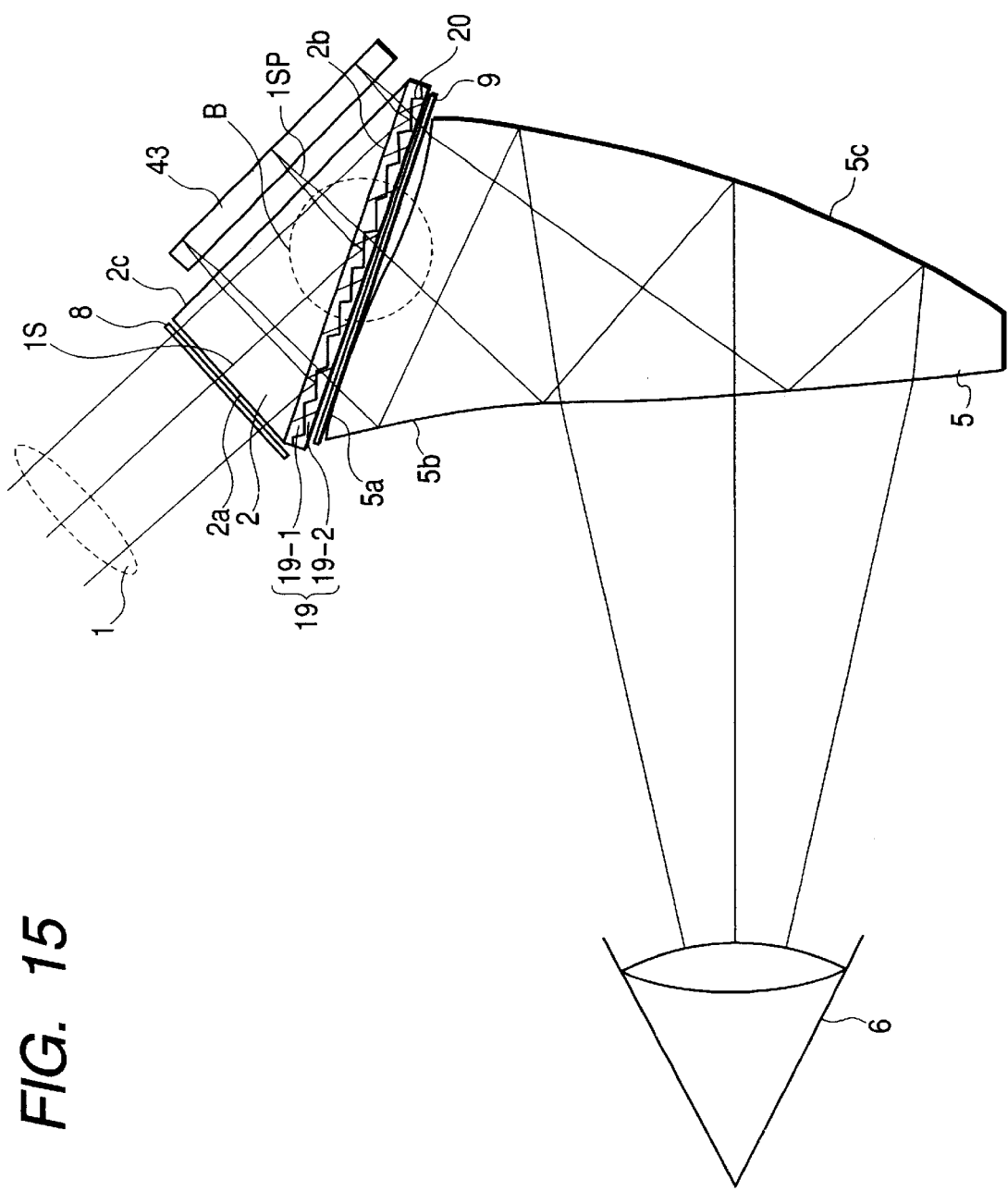
FIG. 15 is a view showing the arrangement of an image display apparatus according to the eleventh embodiment of the present invention.
Figure 16:
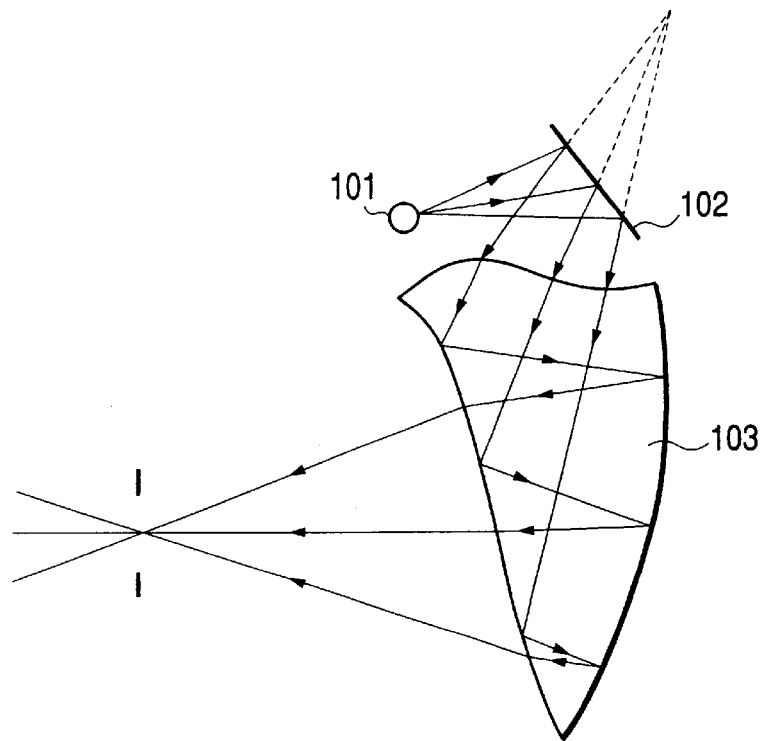
FIG. 16 is a view showing the arrangement of a conventional image display apparatus.
Figure 17:
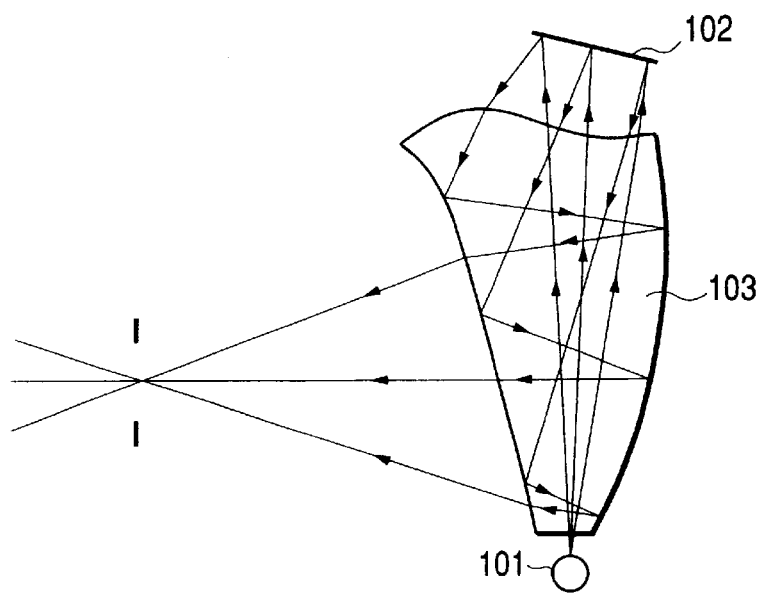
FIG. 17 is a view showing the arrangement of a conventional image display apparatus.

FIG. 15 shows an image display apparatus according to the 11th embodiment of the present invention. The same reference numerals as in FIG. 15 denote constituent elements having the same functions in the respective embodiments described above.

In this embodiment, a reflection type polarization-selective diffraction optical element 19 is integrally formed with a surface 2b of an illumination prism 2 in place of the hologram element in the fourth embodiment.

The reflection type polarization-selective diffraction optical element 19 has first and second layers 19-1 and 19-2, and a boundary surface 20 of the element has a sawtooth cross-section. A polarization-selective layer that allows P-polarized light, which is a polarized light component within the drawing surface of FIG. 15, to pass therethrough and reflects S-polarized light perpendicular to the P-polarized light is formed on the boundary surface 20.

In the image display apparatus of this embodiment, a first polarizing element 8 extracts only S-polarized light 1S, which is a polarized light component in a direction perpendicular to the drawing surface of FIG. 15, from the illumination light 1 from the light source. The S-polarized light enters the illumination prism 2 through a surface 2a and is transmitted through the surface 2b to reach the reflection type polarization-selective diffraction optical element 19.

Since the surface exerting a reflection/diffraction effect on S-polarized light perpendicular to the drawing surface is formed on the boundary surface 20 between the two layers 19-1 and 19-2 of the reflection type polarization-selective diffraction optical element 19, the incident S-polarized light 1S is subject to a strong reflection/diffraction effect and strikes a reflection type liquid crystal display element 43 via the surface 2b and a surface 2c.

Letting θ3 be the incident angle of the S-polarized light 1S incident on the first layer 19-1 of the reflection type polarization-selective diffraction optical element 19, and θ4 be the incident angle of the S-polarized light 1S incident from the reflection type polarization-selective diffraction optical element 19 onto the reflection type liquid crystal display element 43, these incident angles satisfy inequality (2).

Image light 1SP that is reflected by the reflection type liquid crystal display element 43 and emerges therefrom is transmitted through the surfaces 2c and 2b of the illumination prism 2 and reaches the reflection type polarization-selective diffraction optical element 19 again. This image light 1SP is modulated by the reflection type liquid crystal display element 43 such that the polarizing direction is rotated in accordance with the brightness of an image to be displayed on each pixel, and contains P- and S-polarized light components.

Of the image light 1SP, the P-polarized light component that contributes to image formation is transmitted through the boundary surface 20 of the reflection type polarization-selective diffraction optical element 19 without any change, and hence reaches an eye 6 of an observer via a second polarizing element 9 and prism lens 5 as in the other embodiments.

The S-polarized light component contained in the image light 1SP is reflected/diffracted by the boundary surface 20 of the reflection type polarization-selective diffraction optical element 19 and emerges outside via the surfaces 2b and 2a of the prism lens. This light component does not therefore strike the prism lens 5 and exerts no influence on a displayed image.

The pitch and depth of the grating of the reflection type polarization-selective diffraction optical element 19 used in this embodiment are determined by the blazed condition for guiding illumination light to the reflection type liquid crystal display element 43 at a predetermined angle. In addition, the first layer 19-1 of the reflection type polarization-selective diffraction optical element 19 may be made of the same material as that for the illumination prism 2 and directly formed on the surface 2b of the illumination prism to have a sawtooth shape. With this structure, the illumination prism 2 and sawtooth shape can be simultaneously molded by a mold using a resin or glass, thereby simplifying the structure and reducing the manufacturing cost.

The reflection type polarization-selective diffraction optical element 19 of this embodiment may be singly placed between the reflection type liquid crystal display element 43 and the second polarizing element 9 without using the illumination prism 2 in the modification of the ninth embodiment shown in FIG. 12.

The embodiments of the present invention have been described above. In each embodiment, antireflection processing may be performed for each surface through which light from each optical element is transmitted by, for example, depositing a dielectric film, forming a dielectric film by sputtering, coating each surface with a solution by dipping, spinning, spraying, or the like, or forming a fine structure smaller than the wavelength of light used. In addition, a light-absorbing coating is preferably formed on each surface having no optical action to prevent unnecessary reflected light and scattered light, and a member for blocking unnecessary light may be inserted/placed in an optical path, as needed.

In each embodiment described above, the prism lens 5 is used as a projection optical system for allowing the observer to visually recognize an image. However, the present invention is not limited to this, and a lens other than a prism lens or another optical system such as a diffraction optical element, reflecting member, or diffusion member may be used. Furthermore, the present invention may use a scheme of guiding light from an image display means to the observer upon forming the light into an image at least once, a scheme of directly projecting light onto the eyeballs of the observer, or the like.

The image display apparatus of the present invention may be designed to guide an image to a single eye of the observer or guiding images to both the eyes of the observer. In addition, the image display means and the respective optical systems can be arbitrarily arranged in a rotating direction around the axis of sighting of the observer.

As described above, in the light guide optical system (illumination optical system), the optical elements having fine periodic structures and exerting different optical actions on illumination light and image light are arranged in the area where illumination light emitted from the light source and reaching the reflection type image display element passes and image light propagating from the reflection type image display element to the projection optical system passes. This allows control on illumination light for efficiently illuminating the reflection type image display element with a simple structure in the light guide optical system. As a consequence, high-quality image display can be performed through the projection optical system.

In addition, if illumination light from the light source is reflected to be guided to the reflection type image display element in the light guide optical system including the above optical element, the inclination (difference in distance) defined by the reflection type image display element and the incident surface of the projection optical system can be reduced, thereby realizing a compact image display apparatus with good imaging performance.

By using the above optical system, the incident angle of illumination light from the optical system to the reflection type image display element can be easily controlled regardless of the incident angle of the illumination light on the optical element. Even when a reflection type image display element having high incident angle dependence is to be used, therefore, a decrease in the contrast of a displayed image can be suppressed.

What is claimed is:

1. An image display apparatus comprising:
   a light source for supplying illumination light;
   a reflection type display element for modulating the illumination light into image light by reflecting illumination;
   an illumination optical system for guiding the illumination light to said reflection type display element, with said illumination optical system including an optic element, in an area where both the illumination light and the image light pass, which changes optical action depending on a state of incident light; and
   a projection optical system for guiding the image light to an observer,
   wherein the image light is incident on said projection optical system via at least a portion of said illumination optical system, and
   said optical element deflects the illumination light to decrease an incident angle with respect to said reflection type display element as compared with a case where said optical element does not exist.

2. An apparatus according to claim 1, wherein the optical action exerted on the illumination light and the image light by said part changes depending on an incident angle of incident light.

3. An apparatus according to claim 1, wherein said part comprises a diffraction optical part whose diffraction effect changes depending on the incident angle of incident light.

4. An apparatus according to claim 1, wherein the optical action exerted on the illumination light and the image light by said part changes depending on a polarized state of incident light.

5. An apparatus according to claim 1, wherein said part comprises a diffraction optical part whose diffraction effect changes depending on the polarized state of incident light.

6. An apparatus according to claim 1, wherein letting θ1 be the incident angle of the illumination light on said part, and θ2 be the incident angle of the image light, a condition given by $$|θ1|>|θ2|$$

is satisfied.

7. An apparatus according to claim 1, wherein said part comprises a diffraction optical part which is placed in front of said reflection type display element and changes an optical action depending on a state of incident light, and letting θ1 be the incident angle of the illumination light on said diffraction optical part and β be the incident angle of the illumination light on said reflection type display element, a condition given by $$|θ1|>|β|$$

is satisfied.

8. An apparatus according to claim 1, wherein said part comprises a reflection/diffraction optical part whose optical action changes depending on a state of incident light, and letting θ3 be the incident angle of the illumination light on said reflection/diffraction optical part and θ4 be the reflection angle of the illumination light which is subjected to the reflection/diffraction effect of said reflection/diffraction optical part and propagates to said reflection type display element, a condition given by $$|θ3|>|θ4|$$

is satisfied.

9. An apparatus according to claim 1, wherein said illumination optical system comprises an optical member having a first surface on which the illumination light is incident, a second surface by which light incident from the first surface is totally reflected, and a third surface from which the light totally reflected by the second surface emerges toward said reflection type display element, and image light modulated by said reflection type display element enters said optical member through the third surface again and emerges from the second surface toward said projection optical system.

10. An apparatus according to claim 9, further comprising:
a reflection type liquid crystal display element serving as said reflection type image display element;
a first polarizing member for converting the illumination light into S-polarized light and making the light strike said optical member; and
a second polarizing member for analyzing image light modulated into P-polarized light by said reflection type liquid crystal display element.

11. An apparatus according to claim 1, wherein said projection optical system comprises an optical element having a plurality of optical acting surfaces, at least one of the plurality of optical acting surfaces is a reflecting surface, and at least one of the optical acting surfaces is a rotationally asymmetric surface.

12. An image display apparatus comprising:
a light source for supplying illumination light;
a reflection type display element for modulating the illumination light into image light by reflecting illumination;
an illumination optical system for guiding the illumination light to said reflection type display element; and
a projection optical system for guiding the image light to an observer,
wherein the image light is incident on said projection optical system via at least a portion of said illumination optical system, and
said illumination optical system has a diffraction optical part in an area where both the illumination light and the image light pass.

13. An apparatus according to claim 12, wherein an optical action exerted on the illumination light and the image light by said diffraction optical part changes depending on an incident angle of incident light.

14. An apparatus according to claim 12, wherein an optical action exerted on the illumination light and the image light by said diffraction optical part changes depending on a polarized state of incident light.

15. An apparatus according to claim 12, wherein letting θ1 be the incident angle of the illumination light on said diffraction optical part, and θ2 be the incident angle of the image light, a condition given by $$|θ1|>|θ2|$$

is satisfied.

16. An apparatus according to claim 12, wherein said diffraction optical part comprises a diffraction optical part placed in front of said reflection type display element, and letting θ1 be the incident angle of the illumination light on said diffraction optical part and β be the incident angle of the illumination light on said reflection type display element, a condition given by $$|θ1|>|β|$$

is satisfied.

17. An apparatus according to claim 12, wherein said diffraction optical part comprises a reflection/diffraction optical part whose optical action changes depending on a state of incident light, and letting θ3 be the incident angle of the illumination light on said reflection/diffraction optical part and θ4 be the reflection angle of the illumination light which is subjected to the reflection/diffraction effect of said reflection/diffraction optical part and propagates to said reflection type display element, a condition given by $$|θ3|>|θ4|$$

is satisfied.

18. An apparatus according to claim 12, wherein said illumination optical system comprises an optical member having a first surface on which the illumination light is incident, a second surface by which light incident from the first surface is totally reflected, and a third surface from which the light totally reflected by the second surface emerges toward said reflection type display element, and image light modulated by said reflection type display element enters said optical member through the third surface again and emerges from the second surface toward said projection optical system.

19. An apparatus according to claim 18, further comprising:
a reflection type liquid crystal display element serving as said reflection type image display element;
a first polarizing member for converting the illumination light into S-polarized light and making the light strike said optical member; and
a second polarizing member for analyzing image light modulated into P-polarized light by said reflection type liquid crystal display element.

20. An apparatus according to claim 12, wherein said projection optical system comprises an optical element having a plurality of optical acting surfaces, at least one of the plurality of optical acting surfaces is a reflecting surface, and at least one of the optical acting surfaces is a rotationally asymmetric surface.

21. An image display system comprising:

said image display apparatus defined in claim 1 or 12; and an image information output apparatus for supplying image information to said image display apparatus.

22. An optical system comprising:

an illumination optical system for guiding illumination light to a reflection type display element, with said illumination optical system including an optical element, in an area where the illumination light and image light pass, which changes an optical action depending on a state of incident light; and a projection optical system for guiding the image light reflected by the reflection type display element to an observer, wherein tile image light is incident on said projection optical system via at least a portion of said illumination optical system, and, said optical element deflects the illumination light to decrease an incident angle with respect to said reflection type display element as compared with a ease where said optical element does not exist.

23. An optical system comprising:

an illumination optical system for guiding illumination light to a reflection type display element; and a projection optical system for guiding image light reflected by the reflection type display element to an observer, wherein the image light is incident on said projection optical system via at least a portion of said illumination optical system, and said illumination optical system has a diffraction optical part in an area where both the illumination light and the image light pass.

* * * * *

UNITED STATES PATENT AND TRADEMARK OFFICE
CERTIFICATE OF CORRECTION

PATENT NO. : 6,594,085 B2
DATED : July 15, 2003
INVENTOR(S) : Keiji Ohtaka et al.

It is certified that error appears in the above-identified patent and that said Letters Patent is hereby corrected as shown below:

Title page,
Item [56], after *"Primary Examiner"* insert the following:

-- [74] *Attorney, Agent, or Firm*–Fitzpatrick, Cella, Harper & Scinto --.

Column 5,
Line 53, "exist" should read -- exit --.

Column 22,
Line 6, "ease" should read -- case --.

Signed and Sealed this

Thirtieth Day of September, 2003

JAMES E. ROGAN
*Director of the United States Patent and Trademark Office*